United States Patent [19]

Goldwasser et al.

[11] Patent Number: 4,737,921

[45] Date of Patent: Apr. 12, 1988

[54] THREE DIMENSIONAL MEDICAL IMAGE DISPLAY SYSTEM

[75] Inventors: Samuel M. Goldwasser, Bala Cynwyd; David A. Talton, Philadelphia; R. Anthony Reynolds, Philadelphia; Theodore A. Bapty, Philadelphia, all of Pa.

[73] Assignee: Dynamic Digital Displays, Inc., Philadelphia, Pa.

[21] Appl. No.: 740,224

[22] Filed: Jun. 3, 1985

[51] Int. Cl.$^4$ .................... G06F 3/153; G09G 1/16

[52] U.S. Cl. .................... 364/518; 364/521; 364/522; 340/721; 340/723; 340/747

[58] Field of Search ... 364/518, 521, 522, 200 MS File, 364/900 MS File; 358/104, 903; 340/721, 747, 723, 728, 729, 750; 367/71

[56] References Cited

U.S. PATENT DOCUMENTS

| | | | |
|---|---|---|---|
| 3,441,789 | 4/1969 | Harrison, III | 364/522 X |
| 4,130,083 | 12/1978 | Sher | 358/89 |
| 4,160,973 | 7/1979 | Berlin, Jr. | 340/718 |
| 4,209,832 | 6/1980 | Gilham et al. | 358/104 X |
| 4,360,831 | 11/1982 | Kellar | 340/747 X |
| 4,384,338 | 5/1983 | Bennett | 340/729 X |
| 4,436,684 | 3/1984 | White | 264/138 |
| 4,439,760 | 3/1984 | Fleming | 340/799 |
| 4,475,104 | 10/1984 | Shen | 340/729 |
| 4,509,043 | 4/1985 | Mossaides | 340/747 X |
| 4,570,233 | 2/1986 | Yan et al. | 340/747 X |
| 4,586,038 | 4/1986 | Sims | 434/43 X |
| 4,625,289 | 11/1986 | Rockwood | 364/522 |
| 4,627,087 | 12/1986 | Marks | 378/4 |
| 4,641,351 | 2/1987 | Preston, Jr. | 340/747 X |

OTHER PUBLICATIONS

*IBM Technical Disclosure Bulletin*, vol. 23, No. 9, Feb. 1981, Boinodiris, S., "Computer Graphics Using Multi--Echelon Processing Structures", pp. 3996-4005.
"An Architecture for the Real-Time Display and Manipulation of Three-Dimensional Objects"; Dr. S. M. Goldwasser; Bellaire, MI; Aug. 1983.
"An Architecture for the Real-Time Display and Manipulation of Three-Dimensional Objects"; Dr. S. M. Goldwasser.
"Image Shading of Three-Dimensional Objects"; Dan Gordon and R. Anthony Reynolds.
"A Generalized Object Display Processor Architecture"; S. M. Goldwasser; Ann Arbor, Mi; Jun. 1984.
"Image Generation and Display Techniques"; CT Scan Data, Investigative Radiology, vol. 10, No. 5, Sep.-Oct. 1975; by Glenn et al.
"Display of Three Dimensional Information in Computed Tomography"; Computer Assisted Tomography, vol. 1, pp. 155-160, 1977; by Herman and Liu.
"The Multiple-Write Bus Technique" by Renata Gemballa and Rolf Linder; IEEE Computer Graphics and Applications, Sep. 1982, pp. 33-40.
"Image Shading of Three-Dimensional Objects"; Computer Vision, Graphics and Image Processing, vol. 29, pp. 361-376, 1985.
"A Generalized Object Display Processor Architecture"; IEEE Computer Graphics and Applications, vol. IV, No. 10, pp. 43-55, Oct. 1984.
"The Graphics Parcum System" by D. Jackel; Apr. 1985.

*Primary Examiner*—Arthur T. Grimley
*Assistant Examiner*—J. Pendegrass
*Attorney, Agent, or Firm*—Woodcock Washburn Kurtz Mackiewicz & Norris

[57] ABSTRACT

A real-time three-dimensional display device particularly suited for medical imaging is disclosed. The device includes a plurality of individual processing elements each having an image memory for storing a mini-image of a portion of the object as viewed from any given direction and a merge control means for generating a combined image of the object including the depth thereof by selection on a pixel-by-pixel basis from each of the mini-images. In two different embodiments, priority codes are assigned to each of the processing elements reflecting the relative significance of a given pixel of the mini-image produced by a given processing element as compared to the pixels of mini-images produced by other processing elements. In one embodiment, the combined image is generated in accordance with the priority codes. In another embodiment, a Z buffer is used to provide for hidden surface removal on a pixel-by-pixel basis. Improved shadow, shading and gradient processors are provided to provide three-dimensional imaging as well as an improved scan conversion means for generating a coherent image from the combined images merged from all of the processing elements.

54 Claims, 11 Drawing Sheets

THREE DIMENSIONAL MEDICAL IMAGE DISPLAY SYSTEM

BACKGROUND OF THE INVENTION

The present invention relates, in general, to an improved medical image display device and, in particular, relates to an improved device for displaying three-dimensional medical data.

Physicians have an important need for knowledge and information of the structure and condition of a patient's internal anatomy. More importantly, physicians have a need for such information which is obtained by non-invasive techniques. The need for knowledge and information of the structure and condition of the internal anatomy was first filled with the use of X-rays. In recent years, however, the X-ray machine has been supplemented, if not entirely replaced, by medical imaging techniques which yield three-dimensional information. These techniques include, for example, computed tomography, magnetic resonance imaging and ultrasonic scanning.

Perhaps the best known technique of this type is computed tomography (CT). With computed tomography, a complete three-dimensional examination is made up of a sequence of two-dimensional cross-sections or "slices". Slice information is acquired by rotating a thin, fan-shaped beam of X-rays about the long axis of the patient. Each slice is irradiated by its edges; the transmitted X-ray beams are captured with position-sensitive radiation detectors and thus X-ray attenuation measurements are obtained from many different directions across the slice. The two-dimensional images are "reconstructed" from these measurements by a mathematical procedure known as "convolution and back-projection." The output of the reconstructron procedure is an array of numbers (known as pixels in 2D, or voxels in 3D) representing the radiological density (X-ray attenuation) at points within the slice.

A recently developed imaging modality which does not employ X-rays is magnetic resonance imaging (MRI). This technique uses large magnetic fields to excite protons within the body through the phenomenon of nuclear magnetic resonance (NMR). The excited protons produce a radio-frequency (RF) signal which can be position-encoded. Three-dimensional information can be built up slice-by-slice, as with X-ray CT, or an entire 3D volume can be imaged directly. In either case, 2D slices are reconstructed for viewing, using mathematical procedures analogous to those used in X-ray CT. In MRI, the information associated with each voxel is a composite of proton density (essentially, the amount of water present) and so-called T1 and T2 relaxation times, which are functions of physical and chemical structure.

Other three-dimensional imaging techniques fall within the realm of nuclear medicine. The basic principle here is to introduce radioactive substances (radiopharmaceuticals) into the body, relying on their pharmacological properties for uptake into specific organs (for example, radioactive iodine can be used to label the thyroid). These radioactive substances produce radiation which may be measured with position-sensitive detectors external to the body, known as "gamma cameras." Two-dimensional projected images (comparable to those obtained with conventional x-rays) can be generated with analog electronic circuitry. To obtain reliable three-dimensional information, however, single photon emission computed tomography (SPECT) or position emission tomography (PET) is employed, both of which rely on digital techniques. In both these modalities, the information associated with each voxel is a measure of the concentration of radiopharmaceutical at the corresponding point within the patient. SPECT and PET differ from CT and MRI in that the images are fundamentally physiological rather than anatomical (although certain MRI studies have a physiological component). Thus, for example, nuclear medicine studies are used to demonstrate abnormal growth activity in bones which otherwise appear normal.

Another common imaging modality which yields three-dimensional information in digital format is diagnostic ultrasound. This technique relies on the reflection of sound waves at interfaces within the body (e.g., between fluid and soft tissue) to generate "echoes"; the elapsed time between the transmission of a pulsed sound wave and the reception of its echo gives a measure of the distance to the interface. Transmission ultrasound systems have been proposed, but these are currently in the experimental stage. Conventional ultrasound images are built up slice-by-slice in a manner analogous to CT (except that the slices are usually longitudinal rather than transverse); digital techniques are not needed to produce the images although almost all modern devices store the image in digital format to avoid electronic drift and to facilitate post-processing. In this modality, the information associated with each voxel represents the strength of the echo at the corresponding point within the body; this in turn is a measure of acoustic impedance, a function of the type of materials present at the interface.

A major drawback of each of the imaging devices described above is that images are produced which comprise two-dimensional slices of the internal anatomical structures being observed. Physicians must then mentally "stack" an entire series of these two-dimensional slices in order to infer the structure of the three-dimensional objects under investigation. Many problems are inherent in such an approach.

First, the interpretation of a series of stacked, two-dimensional images by a physician requires a great deal of specialized knowledge and skill. Secondly, such an approach is extremely time consuming. Thirdly, the approach is prone to inaccuracy.

What is clearly needed is a medical display device which produces a three-dimensional representation of internal anatomical structures produced from a full series of stacked two-dimensional slices of that structure. What is needed even more is a medical image display device which provides the physician or other observer with the ability t manipulate the object and its image interactively in real time such that the object may be viewed from various directions and in various modes in real time. By real-time display is meant that the video display output should be updated at or near video rates of 30 frames per second. Provided there is minimal or no delay between operator action and the corresponding change in the final image, this update rate would provide instantaneous perceptual feedback. It should be clear that such an interactive, three-dimensional display system permitting a physician to visualize and interact with a shaded, three-dimensional representation of an anatomical structure would greatly facilitate the examination of that structure in conjunction with medical research, clinical diagnoses and the planning of surgical procedures.

A number of 3D display systems for medical objects have been described in the literature, but none of these provide realistic shaded images at the full resolution of the input data with real-time interactive capabilities.

Three-dimensional medical datasets can be displayed in the following ways: (i) true 3D images can be created in space, or (ii) 2½D images can be generated by projecting objects or object surfaces onto a 2D viewing screen with depth cues, or (iii) the data can be reorganized into a sequence of reprojected views or slices.

Most CT and MRI display systems provide facilities to work through a sequence of 2D slices fairly rapidly, so that the trained physician can create a mental impression of the 3D structure. On the other hand, only the original slices captured by the imaging apparatus can be rapidly displayed: re-slicing or re-formatting the data to obtain new cross-sections requires additional computational effort. Re-slicing or re-formatting the data to generate new 2D slices (without re-imaging the patient) is referred to as multi-planar reconstruction (MPR). Early work on MPR was published by Glenn et al, Image Generation and Display Techniques for CT SCAN DATA, INVESTIGATIVE RADIOLOGY, Vol. 10, No. 5, SEPT.-OCT. 1975, and also by Herman and Liu, Display of Three Dimensional Informaton in Computed Tomography, Computer Assisted Tomography, Vol. 1, pp. 155-160, 1977. MPR facilities exist on most CT and MRI display systems, requiring roughly 1 minute of computer time to generate each new slice (depending on its orientation).

True 3D images can be created in space using the varifocal mirror method described in U.S. Pat. No. 4,130,832 Sher. In this method, successive slices are displayed on a CRT under computer control. The slices are viewed by reflection in a mirror whose vibrations are synchronized with the update of the CRT. As the mirror surface moves back and forth, different images (representing different depths) are seen, so that a true 3D image is perceived. The varifocal mirror is a thin membrane whose focal length changes when vibrated so that the virtual images vary over distances of 10–30 centimeters. One disadvantage of the varifocal mirror method is the mechanical nature of this technology. The use of vibrating mirrors is less reliable and convenient than simply viewing 2D or 2½D images on a TV monitor. Another disadvantage is the bandwidth of the CRT itself, since every point in 3D-space must be delivered to the screen in the course of each cycle.

Another method of creating a true 3D image is described in U.S. Pat. No. 4,160,973. This method dispenses with mirrors and CRTs: a planar array of LED's is rotated at high speed, and the individual light sources are turned on and off at the appropriate times. One advantage is that dynamically changing objects can be displayed since the LED's can be switched quite rapidly.

Three-dimensional displays based on the flourescence of a gas excited by a laser have been under investigation for a number of years. In principle, a suitable gas (such as I-Cl vapor) can be made to flouresce at a point in space which is at the intersection of two laser beams, neither of which alone is sufficiently intense to excite flourescence. The intersection point can be scanned throughout the display volume and a 3D image built up in a manner analogous to the (two-dimensional) scanning electron beam in a conventional TV. However, technical difficulties have so far prevented these displays from becoming practical.

Probably the most familiar method of generating realistic images from a 3D scene is to project it onto a 2D viewing screen, and rely on motion parallax, projective geometry, shading and hidden surface removal to create the illusion of depth. The result is similar to conventional TV and motion pictures, which most people readily interpret as representing 3D scenes. In fact, this technique can be employed to generate true 3D images by delivering separate stereoscopic views to each eye, for example using lightweight viewing glasses with electro-optic shutters which operat synchronously with the display.

Objects represented by 1D primitives (contours) can be displayed in real time on calligraphic equipment available from several manufacturers. Typical systems can display about 100,000 short vectors without appreciable flicker, accommodating, for example, 100 contours of 1000 points each —marginally sufficient for complex medical objects. Contour-based "wire-frame" displays provide less realism and depth-cues than their shaded-surface counterparts. Nevertheless, because of the real-time capabilities, calligraphic equipment has been used for interactive surgical planning.

A software-based system running on dedicated hardware which derives shaded surface displays from 1D primitives is available commerically from Contour Medical Systems, Mountain View, California. That system is designed to facilitate surgical and radiation therapy planning, allowing interaction with and modification of the contours on a slice-by-slice basis. The user has the option of creating a shaded graphics (2½D) image, or a 3D model can be fabricated on a milling machine under computer control. (See U.S. Pat. No. 4,436,684.) Following interaction with and modification of the object, a new surface must be formed for shaded graphics display. While surface display can be accomplished rapidly (typically, 45 seconds per view), it cannot be done in real time.

A software-based dedicated physician's workstation which apparently generates 2½D images from voxel faces was recently introduced by Dimensional Medicine, Inc. The software generates and stores a number of views of a rotating object and plays them back in "movie" mode. A typical movie takes about 1 hour to generate and offers little or no interactive capabilities at display time.

A number of high-performance systems which are based on polygon display and which can generate images rapidly are available commerically. These can be used for medical objects provided the voxels are converted to polygons through software preprocessing. The large number of voxels needed to represent complex anatomical objects, however, places severe demands on throughput. Flight simulators represent the state of the art in polygon-based display, both in throughput (several thousand polygons at 30 frames/second) and in image quality, but are insufficient to display the number of voxels found with complex medical objects.

Another method of displaying objects built of polygons and having lower performance than flight simulator systems utilizes "smart frame-buffers" designed as peripherals of general purpose computers. See, for example U.S. Pat. No. 4,475,104 Sher. These typically have throughput slower than that of flight simulators and are too slow for the real-time display of anatomical structures.

An octree-based 3D display system is available commerically from Phoenix Data Systems, Albany, N.Y. This is a single processor implementation of the algorithms developed by Meagher, and is capable of only processing the equivalent of up to $10^6$ voxels per second (i.e., typical views of complex objects are updated once per second) which is too slow to display the typical 3D medical data set in real-time.

It will be seen that none of the existing systems described above provides sufficient throughput for real-time display of medical objects with full resolution.

General concepts of an interactive, real-time, three-dimensional medical object display device which meets this need have been set forth in a paper entitled "An Architecture for the Real Time Display and Manipulation of Three-Dimensional Objects" by S. M. Goldwasser and R. A. Reynolds, two of the co-inventors of the present application, which was presented to the 1983 proceedings of the International Conference on Parallel Processing held in Bel Aire, Mich. in August of 1983. In that paper, a special purpose multi-processor architecture is described which permits the high speed display and manipulation of shaded, three-dimensional objects or object surfaces on a conventional raster scan CRT.

In the foregoing paper, the input to the system is a set of digital data representing the three-dimensional, anatomical object under consideration. This set of data is stored in memory which is referred to as "object space." The problem to which the paper is directed is that of displaying the set of three-dimensional data in object space on a two-dimensional screen in a manner which retains the three-dimensional nature of the object under consideration. When displaying the three-dimensional data set on a two-dimensional screen, most of the stored data is irrelevant and must be ignored. In the three-dimensional data set are many data points representing portions of the back of the object under consideration relative to the viewer which are obscured to the viewer in the final image. Only those data points which are in the front of the object relative to the viewer, i.e., not obscured, are displayed. In short, the problem to which the foregoing paper is directed is the problem of mapping three-dimensional object space onto two dimensional image space while preserving the three-dimensional quality of the final image and doing so in real time.

In the display device disclosed in the aforementioned publication, the object space is a three-dimensional scene partitioned by three sets of parallel planes into cube-shaped volume elements or "voxels." Associated with each voxel is a numeric quantity reflecting the density of the object as determined by the imaging device, i.e. MRI, CT or other data. The density, for instance, is an 8-bit byte representing 256 different density levels.

While the stored voxels of the present invention are typically cube-shaped volume elements, the present invention is not so limited. As will be described in connection with FIG. 2 below, some medical imaging systems such as CT, for example, produce rectangular rather than cubic voxels. The present invention is equally applicable to rectangular or cubic voxels.

The aforementioned publication describes multiprocessor hardware and software which retrieves the respective voxel data and displays and generates a two-dimensional final image. The overall display processor architecture is based on a principle which maps 3D object space into 2D image space using either a Z-buffer or equivalent time ordered display procedure for hidden or obscured surface removal. In the latter version, for a given orientation of the object, pixels are written into a 2D image (display) buffer in time order sequence corresponding to reading out voxels from the back to the front of the object. This approach guarantees that any point that should be obscured in the final image by something in front of it will, in fact, be invisible in the final reconstructed image. The same result can be achieved by using a Z-buffer which controls a selective replacement strategy.

The imaging device described in the aforementioned publication has a number of limitations and drawbacks which have been cured by the present inventors. In addition, certain important enhancements have been added. These drawbacks and enhancements are described below:

Merge Scheme

As described in the foregoing paper, the display computation may be distributed among multiple processing elements. The paper suggests that unless the computation is distributed among multi-processors, real-time display and manipulation would be impossible. The number of voxels any particular processor can render per frame is constrained by memory speed and the time required to complete the coordinate transform from object space coordinates to image space coordinates. Because medical data can typically range in the tens of millions of voxels and because a single processor can only render several hundreds of thousands per frame, it is desirable to distribute the computation among several processors, each assigned to a local region of object space. If the computation is distributed in this manner, it is then necessary to "merge" the mini-images computed by the several processors into one final image representing the entire object space.

In the architecture described in he foregoing paper, the object space is partitioned into 64 subcubes. Each of these subcubes is comprised of $64 \times 64 \times 64$ voxels, i.e., approximately 256,000 voxels, each voxel containing a single eight-bit tissue density byte. The paper describes how the mini-image from sixty-four processing elements can be combined to handle a combined object space of $256 \times 256 \times 256$ voxels. Each of the processing elements computes an individual local, mini-image from its region of the partitioned object space. Eight intermediate processors then create eight sub-images from these 64 mini-images by serially reading the mini-images into the sub-images in back-to-front order. These eight sub-images are then merged in a similar back-to-front serial manner to form the final image.

The scheme of merging mini-images into sub-images, and sub-images into a final image is cumbersome in terms of hardware. For each serial merge an alternating double frame buffer is required. This is a total of nine double buffers (eight for the first level merges, and one for the second level merge). Each double buffer requires significant memory and boardspace. It would be desirable t simplify the hardware configuration.

In addition to hardware simplification it would also be desirable to reduce the time between operator action and the time the final image appears on the display. When the operator reorients the object or interacts with it in any number of ways, he expects to see an instantaneous change in the display of the final image. With the merge scheme described in the aforementioned publication, several video frames elapsed between the time of operator action and the image display of that action. This delay is referred to as "pipeline latency." Each merge level results in a delay of one frame. Thus, in the architecture of the foregoing paper three frames elapse between operator action and a change in the final display. It would be desirable to improve the merge scheme of the foregoing paper to reduce the pipeline latency to more acceptable times.

One additional difficulty found with the architecture of the aforementioned paper is that each processing element is constrained to processing data from a given subset of the data representing the object under consideration. With the architecture described in the aforementioned publication, object space is partitioned into 64 sub-cubes, each sub-cube containing 64×64×64 voxels. Each sub-cube defines a particular unvarying portion of the overall object space. Moreover, the overall object space is configured in a 256 cube shape (4×4×4 sub-cubes). The 64 individual processing elements are grouped into eight groups of eight processing elements. The mini-images from each of the individual processing elements are merged by a group of eight intermediate processors. The intermediate processors are hard-wired to a defined group of eight processing elements.

With the architecture of the foregoing paper, the object space is an unvarying cube configuration. Therefore, if the object under consideration is an elongated, anatomical structure such as a bone, final image resolution is less than optimum because object space is not used efficiently. It would be desirable, in addition to improving the merge scheme set forth in the previous paper, to provide reconfigurable object space to accommodate anatomical structure of differing shape.

Multiple Independently Movable Objects

The utility of many medical images would be greatly enhanced if the display device set forth in the foregoing paper had the further ability of independently manipulating various objects or portions of objects displayed on the screen. For example, it would be particularly desirable to display individual bones of the human skeleton or a portion thereof including appropriate linkages at various joints. It would be desirable to provide a medical imaging display device in which the physician could move and rotate one bone with respect to another in three dimensions.

The aforementioned paper describes the desirability of providing for the display of independently movable objects but does not describe or contemplate a technique for displaying a multiplicity of objects which may be translated and/or rotated with respect to one another in the final image.

Dynamic Display

It would also be desirable to provide a three-dimensional display of time varying anatomical structures. Specifically, it would be desirable to provide a three-dimensional display of the heart as it moved from a first contracted or diastolic position through its various phases to a fully expanded or systolic position. It would also be desirable to compare objects before and after treatment or to study changes in the object with time. Another application is the study of moving joints to study their mechanics.

Slice Plane

In the display device of the foregoing paper, a three-dimensional image is produced. The paper, however, nowhere mentions the desirability of also selectively displaying two-dimensional cross sections of stored three-dimensional objects. Such techniques, however, are known to be useful. In known systems, the original two-dimensional slices captured by the imaging system can be presented to the viewer rapidly—in effect flipping through the slices of the object in the direction the slices have been taken. It would also be desirable, however, to provide the physician with the additional capability of creating arbitrary and new two-dimensional slices by cutting through the object in different planes (i.e., reformatting the original data). This is also known as multi-planar reconstruction (MPR). With such a feature, the physician could better comprehend the inner structure of the object under consideration. It would be desirable to provide a medical imaging display device having a "slice plane" feature which would provide the interactive capability of permitting the physician to observe any two-dimensional cross-sectional view of the object taken from any selected direction. Such a feature would permit the physician to selectively isolate bodily structures for closer observation.

It would also be desirable to provide a medical imaging system having the capability of displaying shaded three-dimensional objects and having the further capability of slicing those objects to view interior structures normally hidden from 20 view. It would be further desirable to provide this reslicing capability from any arbitrary direction of view. One system with this capability is known which is made and sold by Phoenix Data Systems, Inc. This system, however, takes a second or so to display a new sectional view after user interaction. Such time periods are unduly long to permit effective user interaction. Only real time response permits hand-eye coordination of the user to accurately position the slice plane with respect to the object.

Scan-Conversion

One problem associated with the system described in the aforementioned publication is that of unwanted "holes" in the final display. As set forth in the paper, it has been found that holes appear in the output image at certain orientations. These holes occur if object space data is magnified as it is displayed on a final two-dimensional display with a scale-factor greater than 0.577 ($\frac{1}{\sqrt{3}}$). These holes occur because, unless scan-conversion is performed, projected voxels have the appearance of points rather than cubes. At certain orientations and magnifications, there are insufficient points to give the appearance of a solid object on the video output display and holes will result.

The foregoing paper indicates that certain scan-conversion or hole correction techniques had been attempted. The first of these techniques was the display of the centers of the visible faces of each voxel and the second technique was referred to as "double resolution interpolation and resampling." It has been found that neither of the foregoing techniques has solved the problem. It would be desirable to provide a medical imaging display device which eliminates the poor quality image caused by holes in the two-dimensional display of solid objects.

Shading

Another difficulty with the medical imaging system described in the foregoing publication is that of shading the final image. The realistic appearance of computer generated images is greatly enhanced by controlling the brightness of each pixel in accordance with the illumination the corresponding point of the object would receive from one or more simulated light sources. The illumination at a given point depends upon the distance of the object from the simulated light source and the orientation of the surface of the object with respect to light rays from that simulated light source.

Shading methods in computer generated images are well known in the case where objects are modeled by polygons or curved patches. In these approaches, the surface orientation of the object being displayed can be represented by vertex normals stored with each surface element, polygon or patch. However, these prior art shading methods cannot be applied to the real-time display of objects composed of voxels. The reason is that the voxel approach provides facilities to modify or change the orientation of the object at the time of display and, therefore, surface shape and orientation (and therefore vertex normals) cannot be predicted before display.

In the aforementioned paper, the requirements for realistic shading were set forth. In a second and subsequent paper entitled "Image Space Shading of Three-Dimensional Objects" published by one of the co-inventors of the present application, Technical Report MIPG 85, Department of Radiology, University of Pennsylvania, November, 1983, a mathematical solution to this shading problem was proposed which is applicable to voxel-based object space. Although the possibility of performing gradient shading on high-speed hardware was discussed, no practical method of real-time implementation was given. It would be desirable to provide real-time implementation of image space shading to obtain an enhanced a final three-dimensional display in a medical imaging display device of the type described in the aforementioned paper.

Shadows

In addition to realistic shading effects, three-dimensional perception in the final display can be greatly enhanced by adding shadows to parts of the object being displayed which are obscured from the simulated light source by other parts of the object.

The generation of shadows in computer images requires two stages. First, those parts of the object surface being displayed which are illuminated by the simulated light source and those which are not illuminated from a simulated light source must be determined. Secondly, the parts of the object which are obscured from the light source but visible to the observer must have the brightness adjusted in those locations where shadows appear. Methods of generating shadows in computer generated images are known to exist. However, real time generation of shadows cast by moving objects has either been unavailable or, if available, has only been accomplished with extraordinarily expensive hardware and with limited performance. See, Schachter, B. J., ed., "computer Image Generation", Wiley-InterScience, N.Y., 1983. It would be desirable to provide a simplified shadow generating capability in the three-dimensional display of medical images of the aforementioned paper.

Object Editing

An important aspect of three-dimensional imaging in medical applications is the ability to remove unwanted objects, or separate one object from another, in a given scene. For example, it would be particularly desirable for an orthopedic surgeon to disassemble a ball and socket joint display so that both parts could be examined separately. Such segmentation of a given scene can be performed interactively by providing an "object editing" capability enabling the editing of the object space data base and the removal or deletion of parts of objects. The desirability of such a feature was reported in the aforementioned paper, but a mean for achieving it has heretofore not been obtained.

Automatic Volume Determination

Still another feature which would be desirable in the medical imaging device described in the aforementioned publication would be an imaging device having an additional means for quickly and accurately determining the volume of selected organs, tumors, bones, etc. Such a capability is of particular importance in performing comparative studies of tumor growth, treatment effectiveness, rate of post-operative healing, and surgical planning. It would be desirable to provide a medical imaging device providing an automatic readout of the volume of the three-dimensional object under consideration.

Interactive Threshold

Still another enhancement which would be desirable in the medical imaging device described in the aforementioned publication is the ability to quickly select various types of tissue for display with other and different types of tissue being disregarded. For example, it would be particularly desirable to provide a medical imaging device having the capability of displaying a bone and muscle grouping and to interactively display only the bone or only the muscle from that grouping with the corresponding element being removed.

SUMMARY OF THE INVENTION

These and other objects are achieved in accordance with one embodiment of the present inveniton in which a plurality of individual processing elements are provided each having an image memory for storing a mini-image generated by that processing element. A merge control means is provided for generating a combined image from each of the mini-images by selection on a pixel-by-pixel basis. The combined image includes the depth of each visible surface of the object as viewed from any given direction.

In accordance with one embodiment of the present invention, means are provided for generating priority codes reflecting the relative significance of a given pixel of the mini-image produced by a given processing element as compared to the pixels of mini-images produced by other processing elements for a given pixel in the combined image produced by all of the processing elements and a merge control means is provided which is responsive to the priority codes for generating a combined image of the object by selection on a pixel-by-pixel basis from the mini-images. The foregoing arrangement includes much simpler hardware than that set forth in the Goldwasser and Reynolds paper described above. It also reduces the pipeline latency of the merge scheme set forth therein.

In accordance with another aspect of the present invention, logic means are provided for selectively generating a low priority code for pixels of the mini-image of any given processing element. Such a feature permits the inclusion of a slice plane feature.

In accordance with another important aspect of the present invention, a means is provided for selectively mapping points to the image memory of each processing element having a predetermined set of densities. Such a feature permits object editing as described above.

In accordance with stll other important aslects of the present invention, a volume feature counter is provided for accumulating a number of points stored in a given mini-image of a given processing element having a non-zero density dimension for automatic volume determination.

In accordance with still another important aspect of the present invention improved scan conversion means are provided as well as an improved shading processor and shadow processor.

BRIEF DESCRIPTION OF THE DRAWINGS

The present invention will be more fully understood by reference to the accompanying drawings, in which.

DESCRIPTION OF THE PREFERRED EMBODIMENT

Figure 1:
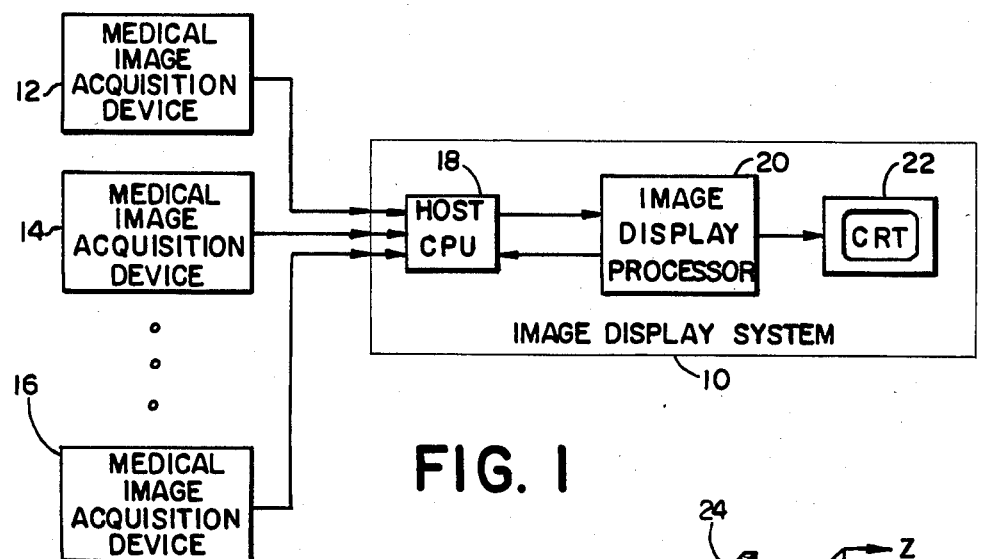
FIG. 1 is a functional block diagram of the three-dimensional medical image display system of the present invention coupled to a plurality of medical image acquisition devices.

Referring now to FIG. 1, the medical image display system of the present invention will be seen generally at 10. The medical image display system includes a host computer 18, an image display processor 20 and a CRT display 22. As shown in FIG. 1 a plurality of medical image acquisition devices 12, 14 and 16 are shown coupled to the system of the present invention. It should be recognized that additional medical image acquisition devices could, of course, also be utilized. The medical image acquisition devices 12, 14 and 16 may comprise CT scanners, MRI scanners, nuclear medicine scanners, ultrasonic scanners or any other medical imaging device capable of generating digital data representing a three-dimensional anatomical object under investigation. In the system of the present invention, such data is directed to the host computer 18. The host computer 18 is responsible for archiving and loading appropriate three-dimensional image files from each of the medical image acquisition devices 12, 14, 16, etc. Each of the three-dimensional image files stored in the host computer 18 are directed to the image display processor 20 of the present invention which generates a dynamic, two-dimensional image of the three-dimensional object for display on a conventional raster scan CRT 22. The image produced by the image display processor 20 may also be directed to the host computer 18 for archival purposes.

Figure 2:
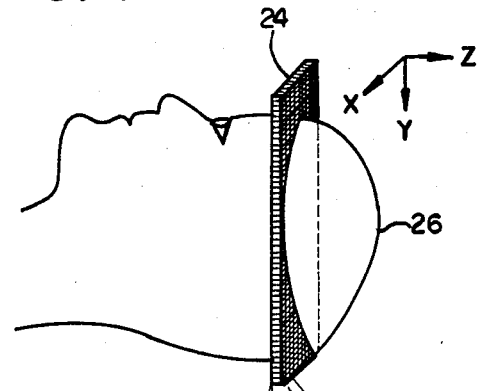
FIG. 2 is a schematic diagram depicting a typical two-dimensional slice of imaging data generated by a single medical imaging device.

Referring now to FIG. 2, the data generated by each of the medical image acquisition devices 12, 14 and 16 will be seen. Each of the medical image acquisition devices 12, 14 and 16 generates a series of slices, one of which is shown at 24 from the patient 26. Each slice comprises an array of voxels one of which is shown at 28, each having a predetermined X and Y position. A plurality of slices such as one shown at 24 are taken in the Z direction to obtain a three-dimensional data set representing the anatomical object under consideration.

As shown in FIG. 2, the voxel 28 is a non-cubic or rectangular voxel in which the dimension in the Z direction exceeds the dimension in either of the X or Y directions. As mentioned above, the present invention finds utility in the display of medical images generated from both cubic and non-cubic voxels. Also, as mentioned above, each of the medical image acquisition devices 12, 14 and 16 produces a series of tissue density bytes (D), each typically, but not necessarily eight bits, associated with each voxel. This tissue density byte reflects the tissue density at that point of the anatomical structure. In short, each of the medical image acquisition devices 12, 14 and 16 produces a three-dimensional array of density values, one for each voxel such as shown at 28 which are directed to the host computer 18 and stored by $X_0$, $Y_0$ and $Z_0$ position. Gated scanners can gather 4D data sets by sampling in time. The present invention also finds utility in the display of 4D data which includes a time dimension.

Figure 3:
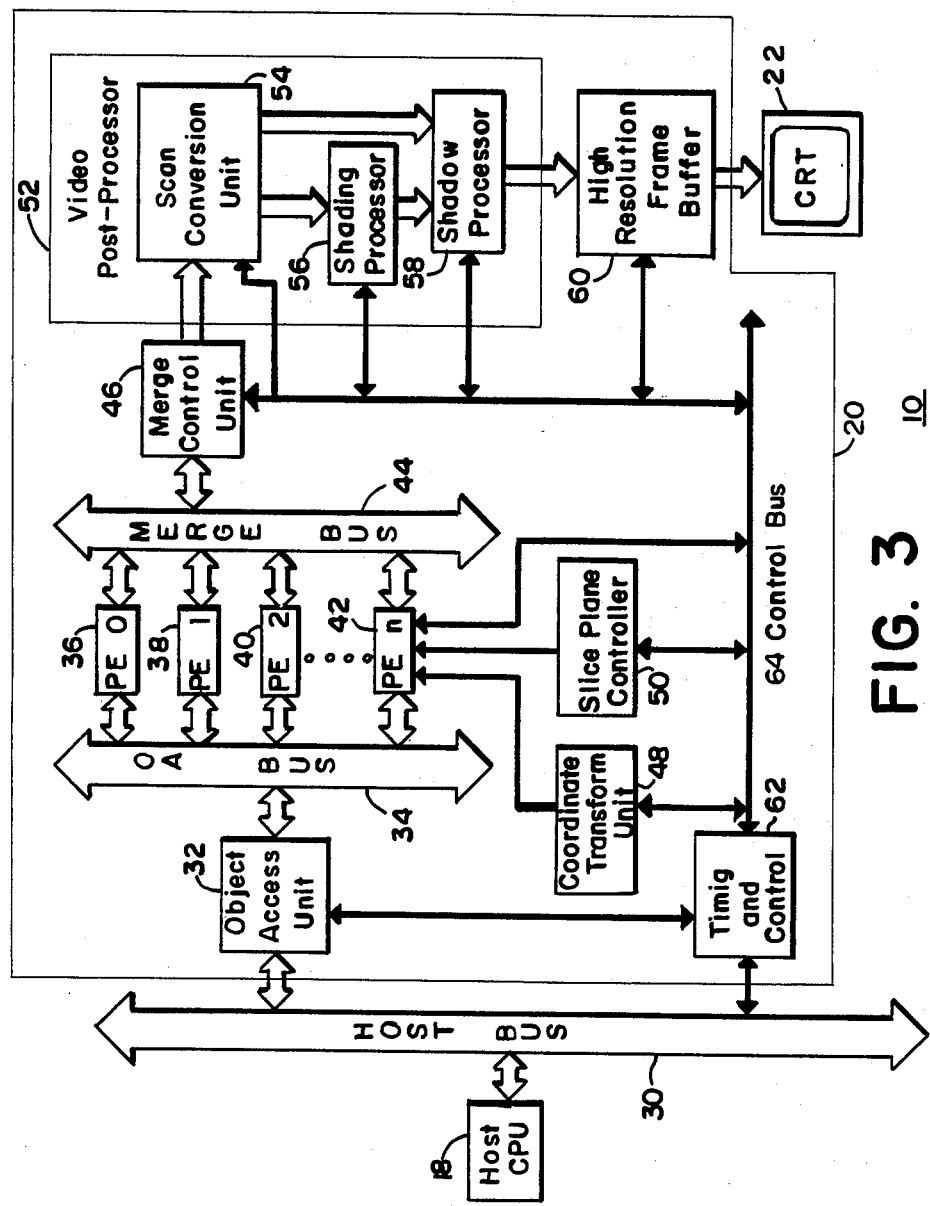
FIG. 3 is a functional block diagram of the medical image display system of FIG. 1.

Referring now to FIG. 3, the image display system 10 of the present invention will be described in detail. As shown in FIG. 3, the image display processor 20 of the present invention is coupled to the host computer 18 via a host bus 30. Voxel data from the host bus 30 is directed from the host computer 18 to an object access unit 32 which will be more fully described below. The object access unit 32 is a high speed interface which permits communications with the host computer system 18. The object access unit 32 permits high speed object data analysis and editing by the host computer 18. The object access unit 32 is responsive to the timing and control unit 62 and receives timing and control parameters from it. Voxel data from the object access unit 32 is directed to the object access bus 34, to a plurality of individual processing elements or PE's, four of which are shown at 36, 38, 40 and 42. In the preferred embodiment of the present invention, 64 individual processing elements are provided. As will be more fully explained below, each of the processing elements such as 36, 38, 40 and 42 include an associated object memory for storing a first digital representation of a portion of the three-dimensional object to be displayed. In other words, each object memory stores a predetermined and variable subset of voxel data transmitted from the object access unit 32. Each of the processing elements also includes an image memory for storing a second digital representation of a two-dimensional mini-image of that portion of the object.

Each of the processing elements 36, 38, 40 and 42 compute a mini-image from the subset of voxel data stored in its associated object memory. The outputs of each of the processing elements 36, 38, 40 and 42, etc., are directed to a merge bus 44 and from the merge bus 44 to a merge control unit 46.

Each of the processing elements 36, 38, 40, 42 etc. operate under the control of a coordinate transform unit 48 and a slice plane controller 50 which will be described below. The coordinate transform unit 48 is responsible for computing the image space coordinates for the mini-image produced by each processing element based upon the position of the corresponding input voxel. The operation of the coordinate transform unit 48 is based upon a recursive decomposition of the time ordered back-to-front display algorithm used for hidden surface removal. The overall computation of image space coordinates is accomplished recursively starting with the largest sub-cubes and working down to individual voxels, dividing by two at each step.

The merge control unit 46 produces a combined image from the individual mini-images produced by each of the processing elements 36, 38, 40, 42, etc. In the preferred embodiment of the present invention, this combined image is directed to a video post-processing unit 52. The video post-processing unit 52 enhances the combined image and generates a two-dimensional shaded image from it by eliminating the presence of holes in the final display, by adding realistic three-dimensional shading and by adding shadows where appropriate. The elimination of holes or aliasing in the final image is accomplished by a scan conversion unit 54 to which the final image is first directed. The output of the scan conversion unit 54 is directed to a shading processor 56 which adds appropriate shading. The output of the shading processor 56 is directed to a shadow processor 58 which adds the requisite shadows.

Each of the scan conversion unit 54, the shading processor unit 56 and the shadow processor unit 58 operates on data from the merge control unit 46 in raster-scan order in real-time. Thus, while the use of all are preferred, the present invention finds utility if any or all of these units 54, 56 and 58 are employed.

The two-dimensional shaded image from the post-processing unit 52 is directed to a high resolution frame buffer 60 where it is stored. The high resolution frame buffer 60 preferably comprises a 1024×1024 double buffer. The frame buffer 60 stores the final image. The frame buffer 60 permits scan conversion to standard video format for display on a monochrome or color raster scan TV monitor 22. The frame buffer 60 is directly accessible by the host computer 18 and is available to display other pictorial data or text. In addition, any displayed image may be read back to the host 18 for archiving or further processing.

A master timing and control unit 62 is provided which is coupled by a control bus 64 to each of the processing elements 36, 38, 40 and 42 through the coordinate transform unit 48 and the slice plane controller 50, to the merge control unit 46, to the scan conversion unit 54, to the shading processor 56, to the shadow processor 58 and to the high resolution frame buffer 60. The control bus 64 also serves to communicate data between the host bus 30 and the frame buffer 60.

To better understand the description that follows, a definition of certain terms is desirable. As used in this application, the following terms have the following meanings:

Original Object Coordinates ($X_0$, $Y_0$, $Z_0$): $X_0$, $Y_0$, and $Z_0$ define the position of a given voxel of data as it was acquired by a given medical image acquisition device such as 12, 14 and 16 as shown in FIG. 1 and FIG. 2.

Object Coordinate or PE Object Coordinate (X, Y, and Z): X, Y, Z define the position of a given voxel as it is stored in the object memory of a given processing element such as 42.

Mini-image Coordinate or PE Image Coordinate ($X'$, $Y'$, and $Z'$): $X'$, $Y'$, $Z'$ define the position of any given voxel in the image memory of a given processing element such as 42. $X'$, $Y'$ and $Z'$, therefore, define any point in the mini-image produced by a given processing element.

Combined Image Coordinates ($X''$, $Y''$, and $Z''$): $X''$, $Y''$, $Z''$ define the position of a given voxel in the combined image produced by merge control unit 46. The combined image coordinates ($X''$, $Y''$, $Z''$) are related to the PE image coordinates ($X'$, $Y'$, $Z'$) by the following relationships:

$$X'' = X' + X\text{-offset}$$

$$Y'' = Y' + Y\text{-offset}$$

$$Z'' = Z' + Z\text{-offset}$$

where X-offset, Y-offset and Z-offset define the relative position of the mini-image produced by a given processing element with respect to the combined image.

With these definitions in mind, the various parts of the image display processor 20 of FIG. 3 will be explained.

Processing Elements

Figure 4C:
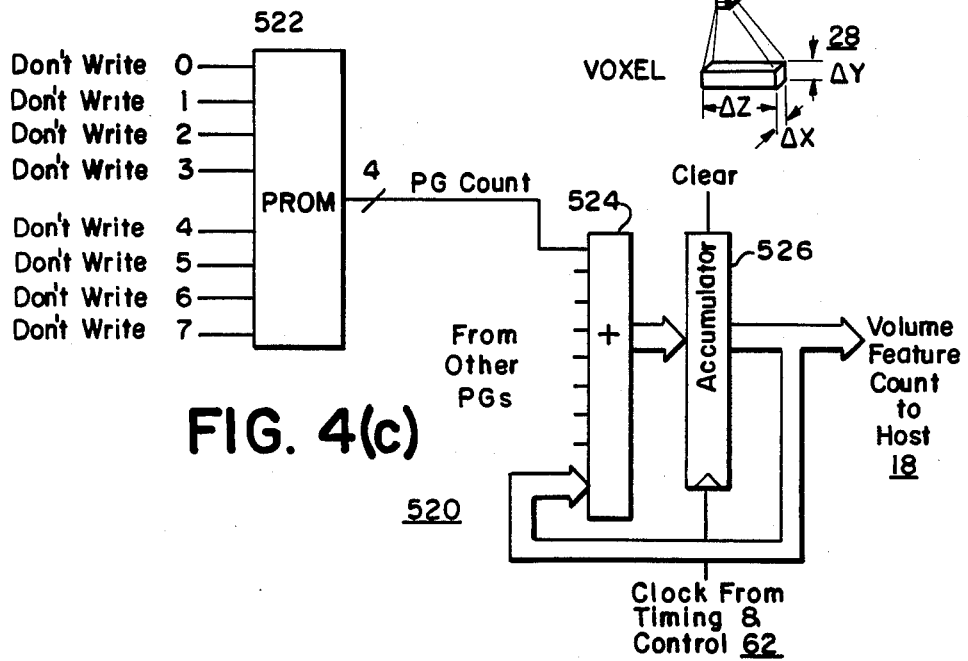
FIG. 4(c) is a detailed block diagram of the Volume Feature Counter of the processing element of FIG. 4(a)
Figure 4A:
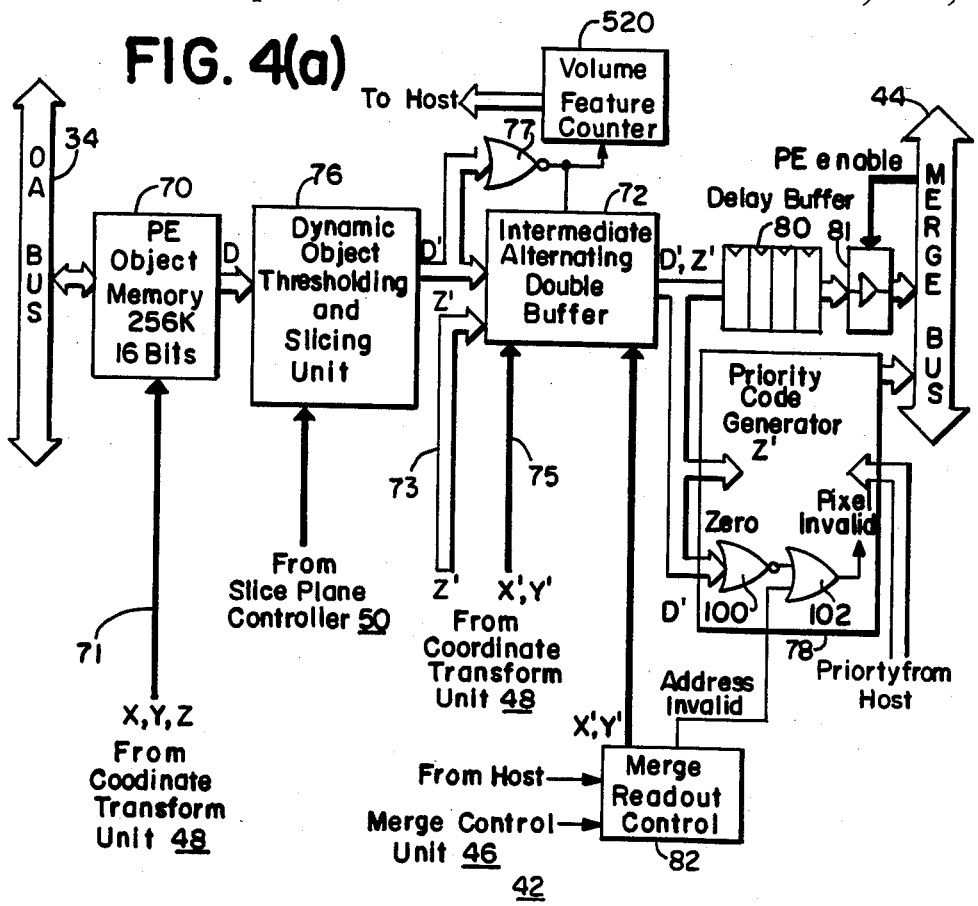
FIG. 4(a) is a functional block diagram of one of the processing elements or PE's shown in FIG. 3.

Referring now to FIG. 4(a), an individual processing element such as 42 will be described in detail, it being understood that the remaining processing elements are identical. As shown in FIG. 4(a), the individual processing element 42 includes an associated object memory 70 to which voxel data from the object access bus 34 is directed. Each object memory 70 preferably comprises a 256K, 16 bit memory which stores a first digital representation of a portion of the three-dimensional object to be displayed. Eight or sixteen-bit tissue density bytes, D, representing that portion of the object are stored in the object memory 70 at appropriate X, Y and Z addresses.

Each individual processing element such as 42 further includes an image memory 72 for storing a second digital representation of a two-dimensional mini-image of the same portion of the object as is stored in the object memory 70. This image memory 72 comprises an intermediate alternating double buffer which stores such mini-image at X' and Y' addresses. X' and Y' represent the horizontal and vertical coordinates of the miniimage. These second digital representations stored in image memory 72 include the depth Z' of the mini-image from a predetermined plane along with the modified density D' of that mini-image.

Each of the individual processing elements such as 42 further includes a means for mapping the first digital representation of a portion of the object stored in the object memory 70 into the second digital representation of a two-dimensional mini-image of that portion of the object stored in image memory 72. This mapping means comprises X, Y, Z address bus 71 from the coordinate transform unit 48 which is directed to the object memory 70 and the X', Y' address bus 75 and Z' data bus 73 from the coordinate transform unit 48 which is directed to the image memory 72. X, Y and Z addresses define any point in the object memory whereas X' and Y' addresses define any point in the image memory 72. At appropriate X', Y' addresses in image memory 72 are stored the requisite values of D' and Z'.

A write enable means 77 is provided, the image memory 72 being responsive thereto. The write enable means 77 insures that only non-zero density values D' are written into the image memory 72. Furthermore the write enable means 77 is coupled to the volume feature counter 520 which will be described in connection with FIG. 4(c) below. The volume feature counter 520 automatically computes the volume of the anatomical object under consideration.

In accordance with the preferred embodiment of the present invention, each of the processing elements such as 42 preferably include a dynamic object thresholding and slicing unit 76 which is coupled between the object memory 70 and the image memory 72 and which will be described in connection with FIG. 4(b) below. Each processing element such as 42 further comprises a means 78 for generating a priority code reflecting the relative significance of the mini-image produced by that processing element for each pixel in the combined image produced by the display device. The output of the priority code generating means 78 is directed to the merge control unit 46 via merge bus 44. The output of the image memory 72 of each processing element such as 42 is coupled to a delay buffer 80 to which two-dimensional mini-images from the image memory 72 are directed and stored on a pixel-by-pixel basis. The output of delay buffer 80 is coupled to the merge bus 44 via an enable gate 81 which is under the control of merge control unit 46. The merge control unit 46 thus gates the mini-image from a given processing element 42 to merge bus 44 if, depending upon its priority code, that mini-image will contribute to the final image.

Each processing element 42 also includes a merge readout control unit 82 which receives input from the host 18 and the merge control unit 46 and which directs output to the image memory 72 and the priority code generator 78.

The merge readout control unit 82 of each processing element is responsive to the merge control unit 46. The merge readout control unit 82 includes a timing means which retrieves image data stored in image memory 72 by X', Y', position whenever the merge control unit 46 is processing a pixel of the combined image (X'', Y'') to which the given processing element might contribute its data. At that time D' and Z' values, stored in the image memory 72, are transferred to delay buffer 80. At all other times, the merge readout control unit 82 generates an address invalid code to the gate 102 of the priority code generator 78.

While one type of processing element is described in connection with FIG. 3, it should be clear that a variety of PE types are possible, for instance, those which render polygons, text overlay, isodose distribution or which generate images in any number of ways. The key is that the individual processing elements render mini-images themselves, under the direction of the host. This allows a dramatic speedup in the generation of the combined image.

Figure 4B:
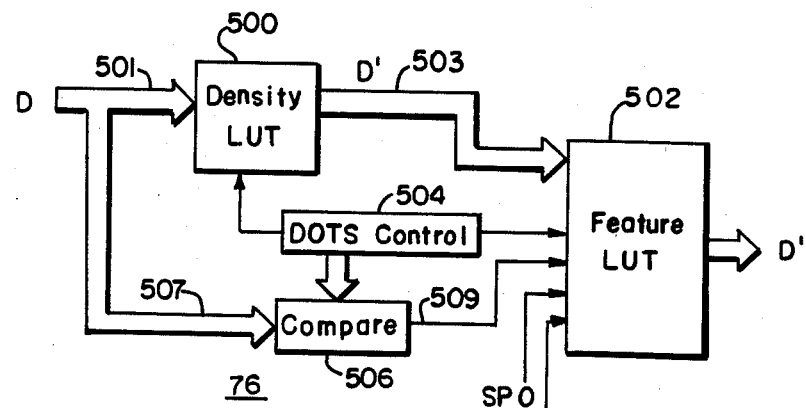
FIG. 4(b) is a detailed block diagram of the Dynamic Object Thresholding and Slicing unit of the processing element shown in FIG. 4(a).

Referring now to FIG. 4(b), the dynamic object thresholding and slicing unit 76 of each of the respective processing elements will be described in detail. Each dynamic object thresholding and slicing unit 76 includes a first density look-up table 500. Eight or sixteen-bit density values, D, from the object memory 70 are directed to the density look-up table 500 via line 501. These 16 bits typically comprise 12 bits of density data as well as a four-bit tag identifier field. This tag identifier field is used to facilitate interactive surgical procedures in a manner which will be described below. The first 12 bits of density data, D, from the object memory 70 are passed through the density look-up table 500 to produce, for example, an eight-bit mini-image density value, D', which is directed via line 503 to the feature look-up table 502. Both the density look-up table 500 and the feature look-up table 502 operate under the control of the dynamic operating threshold and slicing unit control means 504. The dynamic object threshold and slicing control unit 504 further controls a comparator 506. Density values, D, from the object memory 70 are directed to the comparator 506 via line 507 and the output from the comparator 506 is directed to the feature look-up table 502 via line 509. The value of the aforementioned tag identifier field is utilized by the dynamic object threshold and slicing control unit 504 to control the comparator 506 such that the density value D' may be preselected interactively to include only, for example, voxels having the density of bone or muscle, etc., thereby permitting interactive surgical procedures.

The dynamic object thresholding and slicing control unit 504 passes mini-image density values D' through the feature look-up table 502 depending upon whether the particular voxel being processed is in front of or behind a slice plane. This is determined by slice plane control signals, such as SP0 or SP1 (i.e., for two independent slice planes) which are directed to the feature look-up table 502 from the slice plane controller 50 which will be described in detail below.

In addition, the dynamic object threshold and slicing control unit 504 may be used to generate dynamic images. Specifically, the control means 504 may be utilized to generate mini-image density values which are time varying. One technique for displaying time varying data, for example, is to partition each 16-bit object memory word into sub-words, each sub-word representing the density value of a given voxel at a particular time. This data may be collected utilizing the medical image acquisition devices 12, 14 and 16 utilizing gated scanning techniques well known in the art. Utilizing the dynamic object thresholding and slicing unit 76, the appropriate portions of the 16-bit words, in object memory, based on the selected time may be processed and displayed to yield a combined image of a given anatomical object as it exists at different periods of time.

Referring now to FIG. 4(c), the volume feature counter 520 will be described in detail. The volume feature counter 520 is used to automatically determine the volume of each object under consideration. The volume feature counter 520 includes a plurality of programmable read only memories or PROMS 522 there being one such PROM 522 for each eight individual processing elements such as processing element 42 shown in FIG. 4(a). The volume feature counter 520 further comprises an adder 524 to which the outputs of each of the eight PROMS 522 are directed. The output of the adder 524 is directed to an accumulator 526 which operates under the control of the timing and control unit 62. The output of the accumulator 526 is directed to the host 18 via host bus 30.

As each processing element steps through all of the voxels in the object memory 70, the density values D' of voxels to be displayed are directed to the intermediate alternating double buffer 72. These same signals are directed to PROMS 522 of the volume feature counter 520. Thus, for each voxel which might contribute to the final display, a write signal is transferred to the volume feature counter 520. These write signals are combined at the adder 524 and accumulated at the accumulator 526. The accumulated voxel count, which provides a volume indication, is thus directed to the host 18. By suitably programming the dynamic object threshholding and slicing unit control means 504 described in connection with FIG. 4(b) above, the volume feature counter 520 may accumulate a number of voxels, each having a pre-determined density of interest or, alternatively, each having a range of pre-determined densities.

Coordinate Transformation

Figure 5:
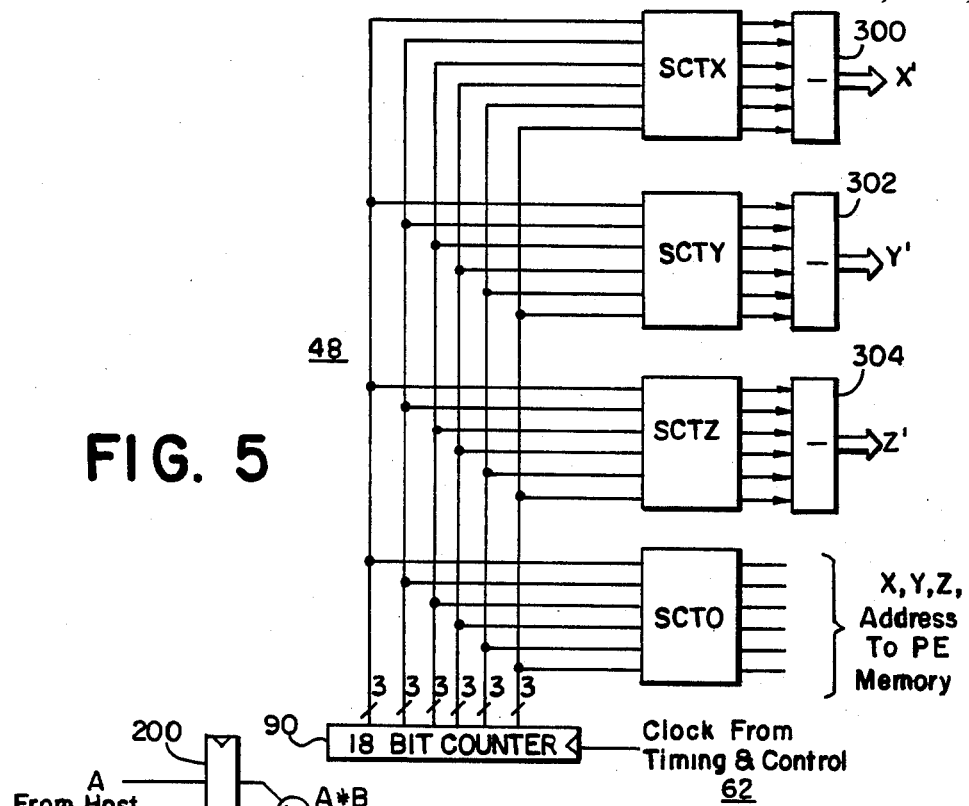
FIG. 5 is a detailed block diagram of the coordinate transform unit of FIG. 3.

Referring now to FIG. 5, the coordinate transform unit 48 will be described in detail. The details of the coordinate transform unit are set forth in the aforementioned paper of Goldwasser and Reynolds entitled "An Architecture for the Real Time Display and Manipulation of Three-Dimensional Objects". In the embodiment described in FIG. 5, a single coordinate transform unit 48 is shown. The single coordinate transform unit 48 shown in FIG. 5 provides X, X', Y, Y', Z and Z' addresses for one of the 64 processing elements 36–42 shown in FIG. 1. It is understood that sixty four coordinate transform units such as 48 are thus provided, one for each processing element. It should be understood that a single, centralized coordinate transform unit 48 could be provided to serve all of the 64 processing elements. This approach reduces the hardware requirements. Nevertheless, in the preferred embodiment, separate, distributed coordinate transform units are preferred because the display of multiple independently moveable objects is facilitated with such an approach.

It should also be clear that the object address XYZ may also have a T (time) or other 4th dimensional component to facilitate the display of dynamic data as mentioned above.

As shown in FIG. 5, the coordinate transform unit 48 preferably comprises an 18-bit counter 90 driven by clock pulses from the timing and control unit 62. The counter 90 drives four registers referred to as SCT 0 and SCT X, SCT Y and SCT Z respectively. Register SCT 0 produces a series of address codes (X, Y and Z) which are directed to the object memories 70 of a particular processing element. The registers, SCT X, SCT Y and SCT Z ultimately produce a second series of address codes (X', Y' and Z') which are directed to the image memory 72 of that processing element. Each of the registers SCT 0 and SCT X, SCT Y and SCT Z are loaded by the host 18 once for each orientation of the object to be displayed. For each such orientation of the object, a given point defined by X, Y and Z coordinates in the object memory 70 will correspond to a point defined by X', Y' and Z' coordinates in the image memory 72.

The outputs of each of the registers SCT X, SCT Y and SCT Z are added at adders 300, 302 and 304 to appropriate offsets to yield X', Y' and Z'.

Once the coordinates of a given mini-image are transformed and directed to the image memory 72 for each processing element, it is necessary to merge that mini-image with mini-images formed at other processing elements to form a combined image. An important aspect of the present invention resides in the improved technique of merging such mini-images which will be described in connection with FIGS. 6(a), 6(b) and 6(c) below.

Merge Scheme

In accordance with the most important aspect of the present invention, the merging of mini-images produced by each of the processing elements such as 36, 38, 40 and 42 is conducted under the control of a merge control unit 46 which responds to priority codes from each of the processing elements such that a final image is produced which includes only those portions of the object to be displayed, i.e., those which are not obscured by other portions of the object as the object is seen from a predetermined point. The unobscured portions are selected from the obscured portions in accordance with the priority codes.

Figure 6B:
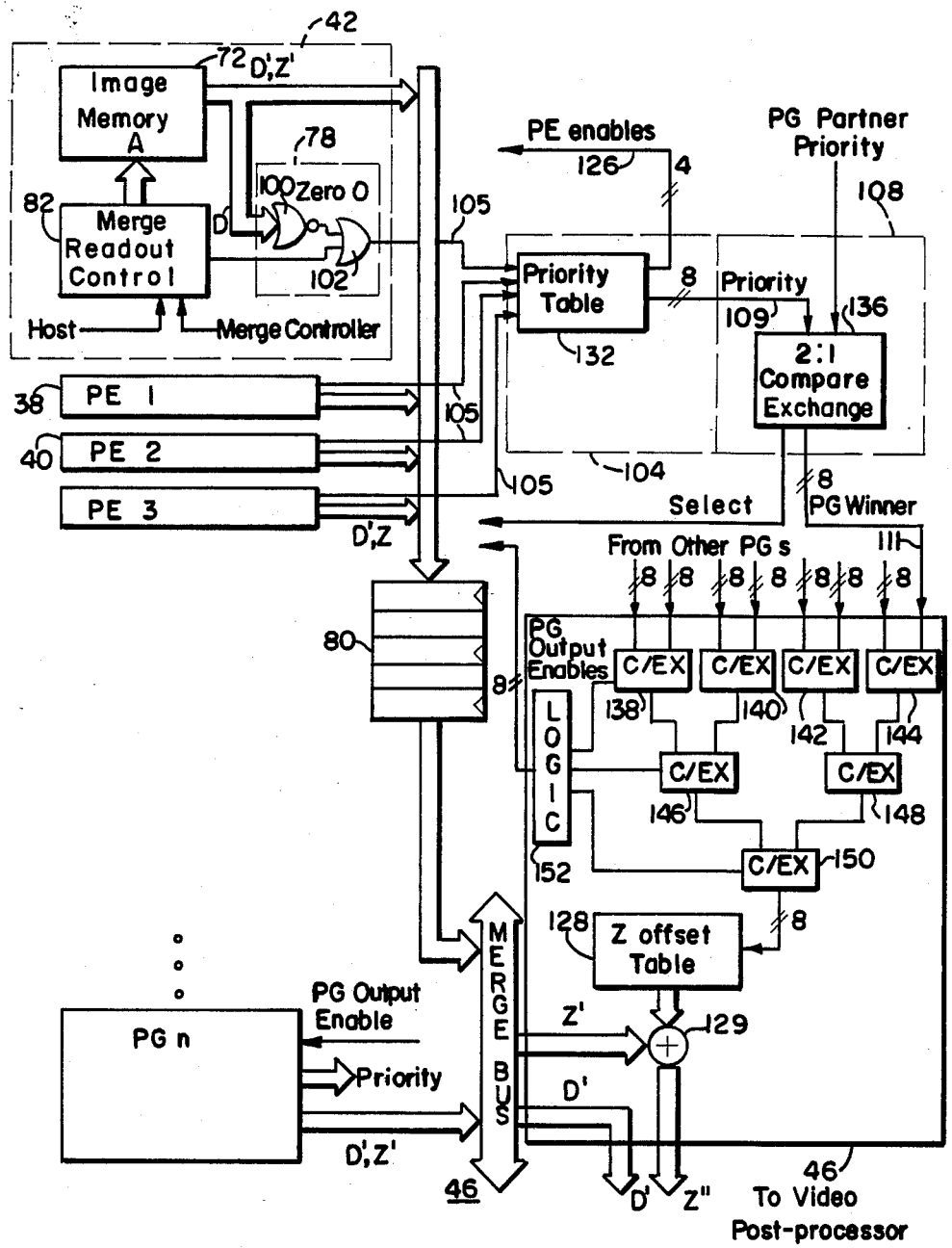
FIG. 6(b) is a detailed block diagram of a second embodiment of the merge control unit of FIG. 3.
Figure 6C:
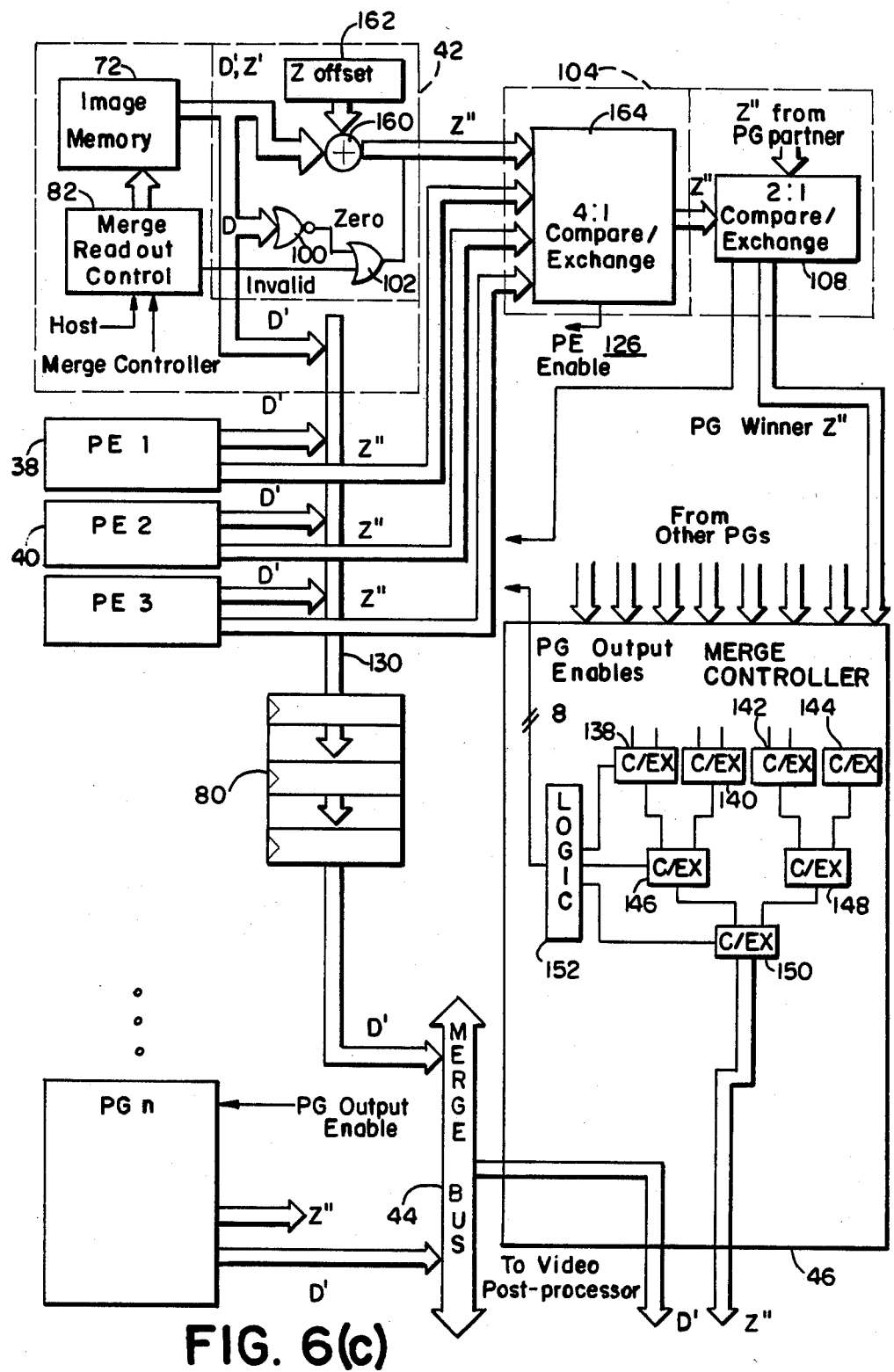
FIG. 6(c) is a detailed block diagram of a third embodiment of the merge control unit of FIG. 3.
Figures 6A, 8A:
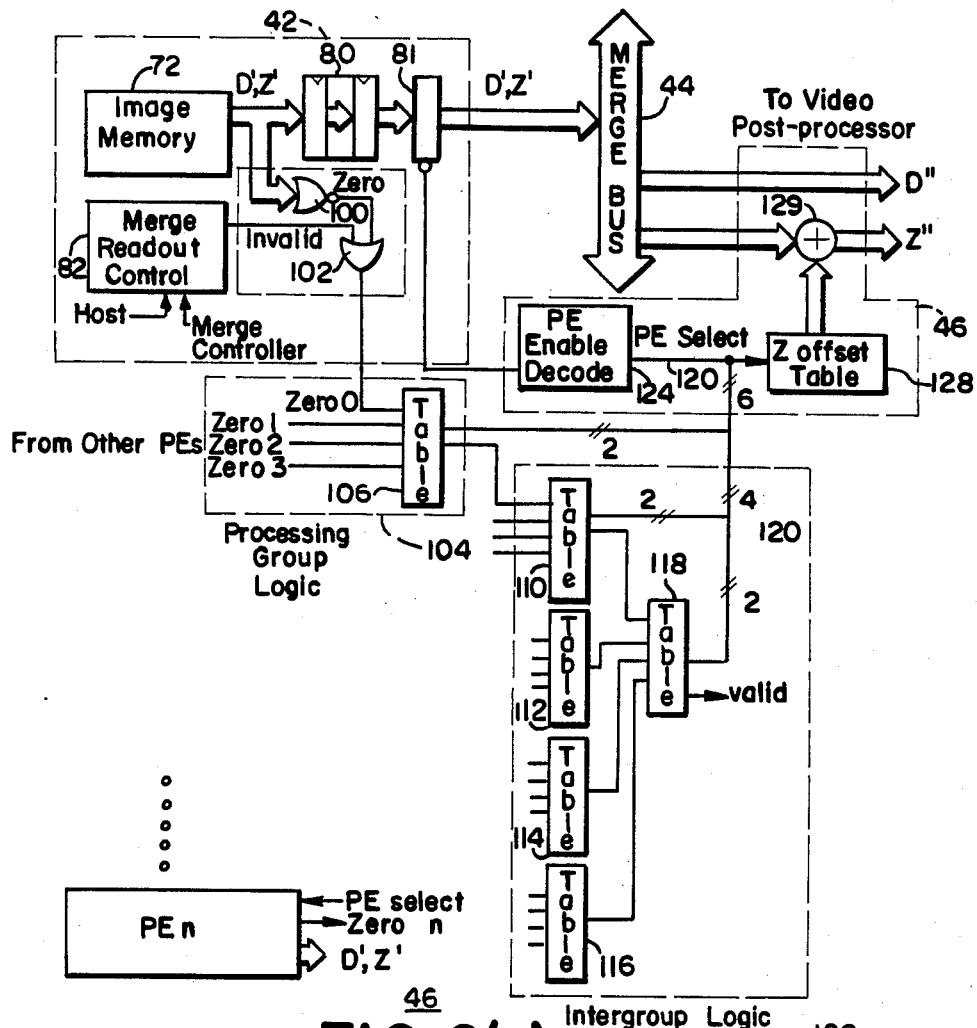
FIG. 6(a) is a detailed block diagram of a first embodiment of the merge control unit of FIG. 3.
FIG. 8(a) is a block diagram of the scan conversion unit of FIG. 3.

A first embodiment of a merge scheme useful in connection with the present invention may be seen in FIG. 6(a). As shown in FIG. 6(a), the processing element 42 includes the image memory 72, the merge read-out control unit 82, the delay buffer 80, and the PE enable 81 described above. The processing element 42 further includes the priority code generation means 78 which comprises gates 100 and 102. The input to gate 100 is coupled to the output of the image memory 72 whereas the input to gate 102 is coupled to the output of gate 100 and also to the merge read-out control unit 82 as shown. The priority code generation means 78 generates a first priority code which may be either a high or low value.

The first priority code generated by the priority code generation means 78 is either a high or a low value depending upon whether the mini-image of that processing element contributes to the combined image. A given processing element is assigned a low priority by priority code generation means 78 whenever the image memory 72 (and, therefore, the associated object memory 70 of that processing element) contains zero values as determined by the gate 100. Additionally, a low priority code is assigned whenever the image memory 72 for that processing element contains non-zero values which are situated between a slice plane and a predetermined point at which a viewer is situated as determined by the threshold and slicing unit 76.

In the embodiment shown in FIG. 6(a), processing group logic 104 is provided which is coupled to the output of the priority code generation means 78 of four separate processing elements. This processing group logic 104 determines the relative priorities of four of the 64 possible processing elements. The processing group logic 104 includes a table 106 containing priority rules determining which of four processing elements contribute to a given pixel of the combined image. It should be understood that in an embodiment containing 64 processing elements, 16 processing group logic blocks such as processing group logic 104 are provided. The sixteen processing group logic blocks 104 generate a second priority code reflecting which of four processing elements connected to each might contribute a given pixel of the final display. The second priority codes from all other processing group logic blocks such as 104 are directed to an intergroup logic block 108. The intergroup logic block 108 includes four tables 110, 112, 114 and 116, each coupled to the outputs of four processing group logic blocks such as 104. Each of the four tables 110, 112, 114 and 116 are further coupled to a fifth table 118, the output of which is a third priority code indicating which processing group such as 104 and which processing element in that group such as processing element 42 will contribute to a given pixel of the combined image. This third priority code is directed via line 120 to the merge control means 46. The merge control means 46 includes a PE enable block 124 and a Z-offset table 128. The PE enable block identifies and enables the selected processing element such as 42 which will contribute to the final combined produced at a given pixel. The PE enable block 124 is coupled by line 126 to the PE enable gate 81. Upon receipt of the third priority code from intergroup logic 108, an enable signal is directed from the PE enable block 124 to the PE enable gate 81 to transfer image data from the delay buffer 80 to the merge bus 44. In addition, the third priority code from intergroup logic 108 is directed via output line 120 to the Z-offset table 128.

The Z-offset table is coupled to an adder 129 which is coupled between the merge bus 44 and the video post-processor 52. The adder 129 computes the absolute depth, i.e., the $Z''$ coordinate of the combined image where:

$Z'' = Z$ offset $+ Z'$; and $Z' = $ the depth coordinate of the voxel with respect to the processing element mini-image; and Z-offset = relative offset of the mini-image with respect to the combined image.

Thus, the input to the video post-processor 52 is a combined image from all of the various processing elements comprising a series of data in raster scan order including density values $D'$ and depth values $Z''$ for each pixel of the final display at CRT 22.

Referring now to FIG. 6(b), a second embodiment of merge scheme useful in connection with the present invention may be seen. Like the embodiment of FIG. 6(a), each processing element such as 42 includes an image memory 72, a merge read-out control unit 82 and a priority code generation means 78 as described above. Unlike the embodiment of FIG. 6(a), however, the processing elements such as 42 do not include the delay buffer 80. Instead, a single delay buffer 80 services a group of four separate processing elements such as 36, 38, 40 and 42 taken together. The outputs of each of the processing elements 36, 38, 40 and 42 are directed on a group bus 130 to the delay buffer 80 and from the delay buffer 80 to the merge bus 44.

As in the embodiment of FIG. 6(a), the merge scheme of FIG. 6(b) includes processing group logic 104 to which the priority code generators 78 of each processing element of a given group of processing elements are directed via lines 105. The processing group logic 104 includes a priority table 132 which is loaded once for each given orientation of the object to be displayed and which produces a second priority code or enabling signal indicated by arrow 126 which determines which processing element of a given group of processing elements will contribute its image data to produce a given pixel in the combined image. The second priority code stored in the priority table 132 thus indicates which of the four processing elements connected to it may contribute to the combined image on a pixel-by-pixel basis. That second priority code is directed to intergroup logic 108 via line 109 where the second priority code is compared with the second priority code from another group of four processing elements. The intergroup logic 108 produces a third priority code which is directed via lines 111 to the merge control unit 46 where it is compared with similar third priority codes from seven other intergroup logic blocks such as 108. The third priority code from the intergroup logic block 108 thus identifies which processing element of two groups of four processing elements will contribute its image data to a given pixel of the final image. The merge controller 46, in turn, determines which processing element in the eight groups of eight processing elements will contribute its data to the combined image.

The merge control unit 46 comprises a compare-exchange tree comprising compare-exchange blocks 138–150. A first level of compare-exchange blocks include blocks 138, 140, 142, and 144. The third priority code from two intergroup logic blocks 108 are directed to that compare-exchange tree. A second level of two compare-exchange blocks 146 and 148 are arranged such that compare-exchange block 146 is coupled to the outputs of first level compare exchange blocks 138 and 140 whereas the second level compare-exchange block 148 is coupled to the outputs of compare-exchange blocks 142 and 144. A third level compare exchange block 150 is coupled to the outputs of second level compare exchange blocks 146 and 148. The compare exchange tree comprised of compare exchange blocks 138–150 is coupled to a logic block 152 which determines which processing group and, therefore, which processing element in that group will contribute data for a given pixel of the final image. The output of logic block 152 is directed to the delay buffer 80 of the appropriate processing group. Receipt of an enable signal at the appropriate delay buffer 80 transfers data from the appropriate processing element from the delay buffer 80 to the merge bus 44. The data transferred to the merge bus 44 from the selected processing element includes an eight-bit tissue density byte D and the Z', or image depth values originally stored in the image memory 72.

The output of compare exchange block 150 is also directed to a Z-offset table 128 the output of which is directed to an adder 129. Also directed to the adder is the Z' or depth value of the selected processing element. Like the embodiment of FIG. 6(a), the adder 129 computes the Z" coordinate of the combined image such that:

$Z'' = $ Z-offset $+ Z'$.

As in the embodiment of FIG. 6(a), values of D' and Z" are directed to the video post-processor 52 in raster scan order on a pixel-by-pixel basis.

Referring now to FIG. 6(c), a third embodiment of a merge scheme useful in connection with the present invention will be described. As in the embodiments of FIGS. 6(a) and 6(b), each individual processing element such as 42 includes an image memory 72, a merge readout unit 82 and a priority code generating means 78. As in the embodiments of FIGS. 6(a) and 6(b), the priority code generating mean 78 includes gates 100 and 102 which generate a first priority code having two states, i.e., a high priority and a low priority value.

In the embodiment of FIG. 6(c), the output of image memory 72 is also directed to an adder 160 where the Z' address of image data is summed with the Z offset value from Z offset register 162. The summation of the Z' address from image memory 72 and Z-offset value from the Z-offset register 162 is the absolute depth Z" of the given pixel from a predetermined point in the combined image. It should be clear that Z" is equal to the sum of Z'+Z offset. Upon receipt of a first high priority code from gate 102 the means for generating a priority code 78 directs the Z" values from the adder 160 to processing group logic 104. In the embodiment of 6(c), therefore, the first priority code generated by the priority code generating means 78 reflects the absolute depth Z" of a given pixel produced by that processing element in the combined image. Z" values from each group of four processing elements such as 36-42 are directed to the processing group logic 104 where the Z" values are compared in a four-to-one compare-exchange tree 164. The compare-exchange tree 164 selects the processing element 36-42 having the lowest absolute Z" value, i.e., the processing element producing a pixel closest to the vantage point of the observer of the combined image. The compare exchange tree 104 thus enables the processing element 36-42 having image data with the highest priority to be displayed for a given pixel to advance that data to delay buffer 80. The processing group logic 104 further produces a second priority code also consisting of Z" value for the selected processing element 36-42 and directs that second priority code to intergroup priority logic 108 where it is compared with the Z" values from another group of four processing elements. The intergroup logic 108 generates a third priority code directed to the merge controller 46. That third priority code also comprises the absolute Z" value of the processing element from one or the other of two groups of four processing elements which will contribute to a given pixel in the final image. The compare-exchange tree of the merge control processor 46 includes compare-exchange blocks 138-150, as well as logic block 152 which generates an enable signal to the delay buffer 80 of the selected processing group. Receipt of the enable signal at that delay buffer 80 of the selected group advances the data from the selected processing element of that group to the merge bus 44 for transmission to the video post processor 52.

In each of the embodiments of FIGS. 6(a), 6(b) and 6(c), a merge scheme is employed which permits the formation of a combined image from the mini-images produced by the individual processing elements. The combined image is formed, preferably in raster scan order, on a pixel-by-pixel basis. Such an approach reduces pipeline latency and permits real-time user interaction 10 with the combined image. Moreover, this reduction in pipeline latency is achieved with a relatively simplified hardware configuration over that set forth in the aforementioned paper.

In addition, in accordance with an important aspect of the present invention, the priority codes which determine which particular processing element will contribute its image data to a given pixel of the combined image of all of the processing elements may be varied from one configuration of the object to the next. The generation of second and third priority codes, for example, is table driven. Depending upon the priority rules stored in such tables, different ones of the overall group of processing elements may be caused to contribute to the combined image. Thus, for example, the processing elements 36, 38, 40, 42, etc. may be reconfigured to better represent, for example, a long, thin object as opposed to a round object. The priority codes may be adjusted to ensure that all of the processing elements are utilized together t maximize resolution in the appropriate areas.

In the preferred embodiment of FIG. 6(c), which employs a Z compare priority determination on a pixel by pixel, raster scan basis, the maximum in flexibility is achieved. For example, with that embodiment, portions of a combined image may be interactively translated with respect to other portions and with respect to the combined image. In fact, those portions may be translated so as to overlap each other. Moreover, if each processing element is provided with its own associated coordinate transform unit 48, portions of the combined image may be independently reoriented with respect to other portions. To accomplish this objective some subset of the processing elements may be assigned to produce a mini-image of a given portion of an object while other processing elements are assigned to produce mini-images of other portions of the object or of another object.

These features are important, for example, in permitting a physician to examine moving joints such as a ball and socket joint, knee joint, etc.

Slice Plane Controller

Figure 7:
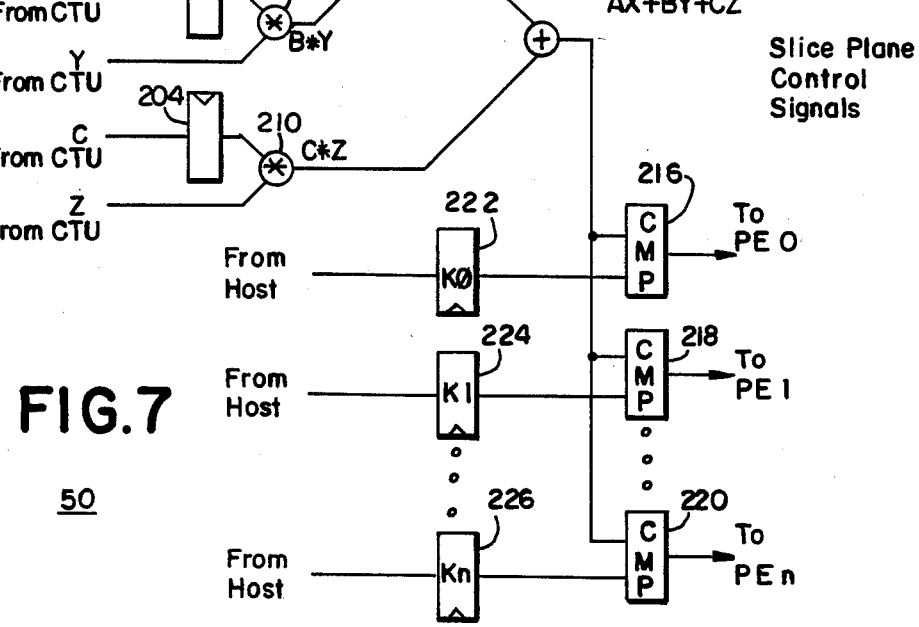
FIG. 7 is a detailed block diagram of the slice plane controller of FIG. 3.

Referring now to FIG. 7, the slice plane controller 50 and the general slice plane feature of the present invention will be described in detail. The slice plane controller 50 provides a means for deleting from the combined image those portions of the object under consideration which lie in front of a given plane. In object coordinates that plane is defined by the expression:

$$A(X+k_i 64)+B(Y+l_i 64)+C(Z+m_i 64)=K \quad (1)$$

where
X, Y and Z are object coordinates; and
$k_i$, $l_i$ and $m_i$ define a particular processing element of the 64 processing elements; and
A, B, C and K are predetermined constants.
Expression (1) may be rearranged as follows to yield:

$$A(X)+B(Y)+C(Z)=K-Ak_i 64-Bl_i 64-Cm_i 64 \quad (2)$$

From expression (2) 64 different constant values K0 through K63 may be determined, one for each processing element as follows:

$$K0 = K - Ak_0 64 - Bl_0 64 - Cm_0 64 \quad (3)$$

$$K1 = K - Ak_1 64 - Bl_1 64 - Cm_1 64$$

$$''$$

$$''$$

$$K63 = K - Ak_{63} 64 - Bl_{63} 64 - Cm_{63} 64$$

All of these values K0 through K63 are computed by the host 18 based upon the desired position of the slice plane.

The slice controller 50 of FIG. 7 includes three registers 200, 202 and 204 to which values of A, B and C are directed from the host 18 and stored. The outputs from registers 200, 202 and 204 are directed to multipliers 206, 208 and 210, respectively. Also directed to the multipliers 206, 208 and 210 are X, Y and Z addresses from the coordinate transform unit 48. The multipliers 206, 208 and 210 thus compute values AX, BY and CZ, respectively. These values are summed at adders 212 and 214, thus producing the quantity AX+BY+CZ which is directed to a plurality of comparators 216, 218 and 220, etc., there being one such comparator for each of the processing elements. Also directed to the comparators 216, 218 and 220 are the outputs of a plurality of registers 222, 224 and 226, there being one such register for each such processing element. The comparator 216, 218 and 220 determine whether a given voxel is in front of or behind the selected slice plane and each generates the appropriate slice plane control signals which are directed to the individual processing elements.

The slice plane controller of FIG. 7 has been described in connection with the deletion from the combined image of portions of the object which lie in front of a given plane, i.e., the removal from the combined image of points having a predetermined depth function with respect to the plane of the output display. It should be understood, however, that this depth function need not define a planar surface. For example, it may be desirable to delete from the combined image all points on one side of a given curved surface, rather than a planar surface, having a predetermined depth function with respect to the plane of the output display.

Scan Conversion Unit

As mentioned above, the output from the merge control unit 46 is a combined image produced from the outputs of each of the individual processing elements, formed preferably in raster scan order. The combined image comprises a Z" or absolute depth value and a D' or density value for each pixel to be displayed. The combined image is directed to the video post-processing unit 52 which generates an enhanced image from the combined image. The video post-processing unit 52, also mentioned above, preferably includes a scan conversion unit, 54, a shading processor 56 and a shadow processor 58, each of which is desirable though not necessary to produce the final enhanced image. The combined image from the merge control unit 46 is first directed to the scan conversion unit 54 which eliminates the problem of holes mentioned above to yield a coherent image. The scan conversion unit 54 will be described in detail in connection with FIGS. 8(a), 8(b) and 8(c).

Each value of the coherent image i.e. D' and Z" represents the density and absolute depth of the two dimensional image of a particular voxel. In fact, in accordance with the preferred embodiment each value of the combined image, i.e., D' and Z" represents the density and absolute depth of the center of a given voxel. Thus each three dimensional voxel is projected in two dimensions as a single point. It is necessary, however, in order to form a coherent image, to project each voxel in two dimensions as an area as opposed to a point. In accordance an important aspect of present invention this is accomplished by means of a stored template which represents the projected area of a typical voxel in two dimensions. The stored template must be varied depending upon the relative orientation of the object. The template must also be varied depending upon the scale factor by which each voxel is projected and also by the shape of the voxel, i.e., whether cubic, rectangular, parallellapiped, etc. In carrying out the foregoing the host 18 determines the template for each orientation, scale factor and voxel shape employed.

In accordance with the present invention, therefore it is desirable to paint in the CRT display not only the pixel which represents the center of a given voxel but also neighboring pixels which represent the area within the stored template for that voxel. In carrying out the foregoing a buffer is provided which stores the combined image (D', Z"), that buffer being responsive to a template memory. The coherent image (D", Z''') from the buffer includes points of the combined image enlarged by the area of the template.

If the projections of the template of two different voxels fall on the sam pixel it is also necessary to position the closer of the two templates to the viewer and to ignore the other at that pixel. In accordance with the present invention this is accomplished by comparing the depth values of the two templates. The foregoing will be better understood by referring to FIGS. 8(a)-8(c).

As shown in FIG. 8(a), current values of the combined image, i.e., D' and Z" are directed in raster scan order to a serpentine buffer 230 which is responsive to the stored template memory 232 to yield a coherent image consisting of digital values referred to as D" and Z'''. The digital values of the coherent image, D" and Z''' are a function of combined image D' and Z" and are delayed in time therefrom. During that time delay, each pixel of the combined image, D', Z" is compared against the neighboring pixels in, for example, a 3×3 pixel array. Values of a current pixel of the combined image, D', Z" are substituted by values for neighboring pixels which have been found to be closer to the screen of the CRT 22. Thus, if the current pixel (D', Z") has a neighboring non-zero pixel which is closer to the vantage point of the viewer than the current pixel and if the template of that neighboring pixel overlaps the current pixel, then the coherent image (D", Z''') is set equal to the density value (D') and the depth value (Z") of that neighboring pixel. This depth value (Z") may be adjusted by adding a distance offset stored in the corresponding location of the template memory 232. This form of data interpolation has been found to be particularly useful in yielding coherent images which do not include holes and without undue time delay.

In accordance with an example of the present invention, the template to be employed and against which the combined image is compared is a 3×3 pixel template. Thus, the combined coherent image is time delayed by the scan conversion device 52 of the present invention by two scan lines and three pixels. It will be appreciated that each pixel of the combined image may be compared against its eight adjacent pixels during this time delay.

The serpentine buffer 230 which permits the comparison of a given pixel of the combined image with its neighboring pixels will be described in connection with FIG. 8(b) below.

Figure 8B:
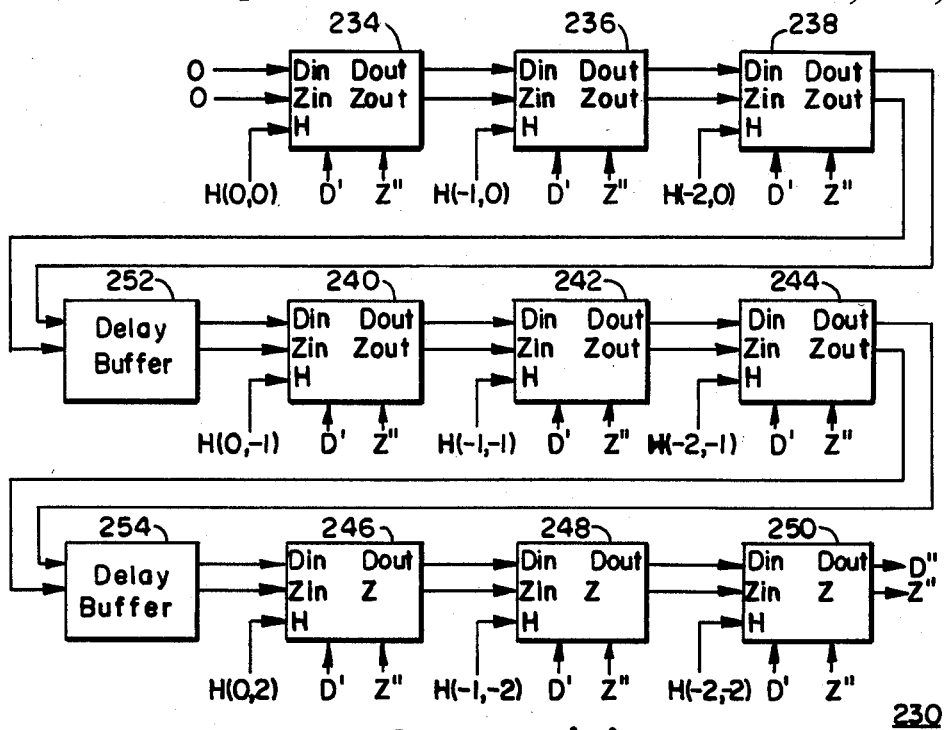
FIG. 8(b) is a detailed block diagram of the serpentine buffer of the scan conversion unit of FIG. 8(a)

As shown in FIG. 8(b), the incoming pixels of the combined image (D', Z") are supplied to the serpentine buffer 230 which includes a matrix of nine distance comparator elements 234-250. After a time delay of two scan lines plus three pixels, the last of the distance comparator element 250 yields an output of the coherent image (D", Z'''). Each pixel of the coherent image (D", Z''') will be identical to its corresponding pixel of the combined input image (D', Z") unless it is determined by the distance comparator elements 234–250 that values of that pixel should be replaced by values of neighboring pixels. Each pixel of the coherent image may differ from the corresponding combined input pixel if it is within the template of another pixel and that other pixel is non-zero and closer to the viewer.

Figure 8C:
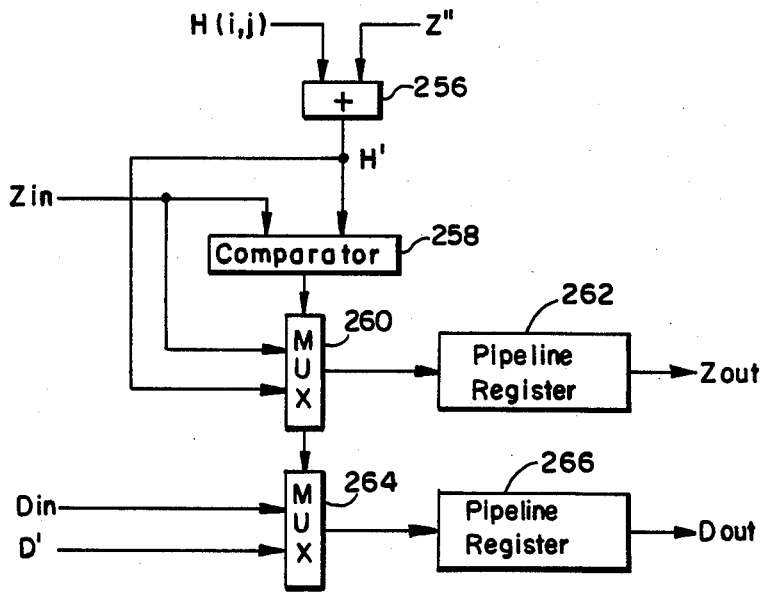
FIG. 8(c) is a detailed block diagram of a single distance comparator element of the serpentine buffer shown in FIG. 8(a)

Referring now to FIG. 8(c), one of the distance comparator elements such as 234 will be described in detail. As shown in FIG. 8(c), the distance comparator element 234 includes an adder 256 to which depth values Z" of the combined image are summed with the depth values H (I, J) of the appropriate value of the template. The summation, H', is the distance to the front face of the voxel (as opposed to the center) from the viewer. This value, H', is directed to a comparator 258. Also directed to the comparator 258 is a value of $Z_{IN}$ which represents the depth from the viewer to the front face of the immediate neighboring voxel. The comparator 258 controls a first multiplexer 260 which passes either the value of H' or $Z_{IN}$, depending on which is closer to the vantage point of the viewer, the value being directed to a pipeline register 262. The comparator 258 further controls a second multiplexer 264 to which is directed the density value of the combined image, D', and the density of the immediate neighboring voxel, $D_{IN}$. Either the density value D' or $D_{IN}$ are passed by multiplexer 264 to pipeline register 266 depending on whether the current voxel or the neighboring voxel are closer to the vantage point of the viewer. The output of pipeline registers 262 and 266, $Z_{OUT}$ and $D_{OUT}$, are directed to the neighboring distance comparator element 236 as shown in FIG. 8(b).

Shading Processor

Figure 9A:
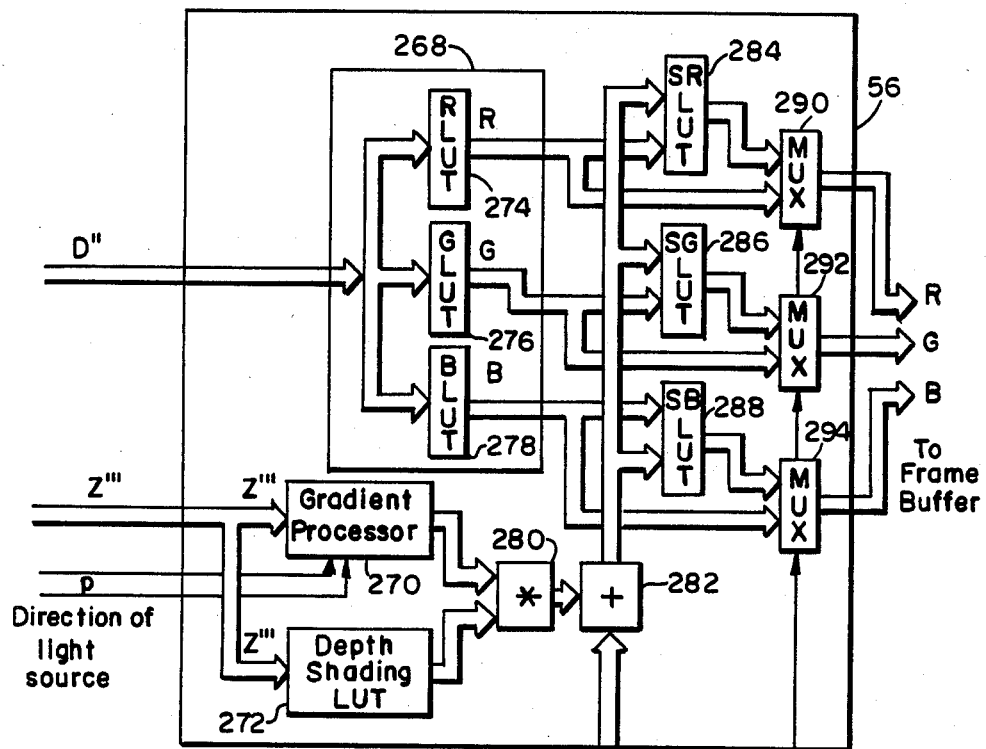
FIG. 9(a) is a block diagram of the shading processor shown in FIG. 3.

The coherent image, D", Z''', from the scan conversion unit 52 is directed to the shading processor 56 as shown in FIG. 3 and as described in detail in connection with FIG. 9. The shading processor 56 as shown in FIG. 9 is responsive to the scan conversion means 52 and varies the intensity of portions of the coherent image produced by the scan conversion means with respect to the intensity of other portions of the coherent image to yield realistic shading effects. The output of the shading processor means 56 comprises a parallel series of 8-bit color signals including a red signal (R), a green signal (G), and a blue signal (B).

The shading processor 56 shown in FIG. 9 includes a density shading processor 268, a gradient processor 270, and a depth shading processor 272. D" values of the coherent image from the scan conversion unit 52 are directed to the density shading processor 268, whereas depth values Z''' from the scan conversion unit 52 are directed respectively to the gradient processor 270 and to the depth shading processor 272.

The density shading processor includes a memory comprising three look-up tables, a red, green, and blue look up table, 274, 276, and 278, respectively. The red, green, and blue look-up tables, 274, 276, and 278, produce a pseudo color encoding well known to those skilled in the art.

Depth values Z''' from the scan conversion unit 52, as mentioned above, are directed to the depth shading processor 272 which yields intensity values corresponding to the depth, Z''' of the coherent image, the smaller or lower the depth value from the vantage point of the viewer, for example, the higher the value of the intensity. The intensity values from the depth shading processor 272 are directed to a multiplier 280. The depth values Z''' from the scan conversion unit 52 are also directed to the gradient processor 270 which yields intensity values corresponding to the orientation of the object with respect to a simulated light source, the more oblique the angle of orientation with respect to that light source the lower the intensity value. The intensity values from the gradient processor 270 are also directed to the multiplier 280, the output of which is directed to an adder 282 which combines the product of the intensity values from the gradient processor 270 and the depth shading processor 272 with a pre-determined, variable value of simulated ambient light. The output from adder 282, along with the output from the density processor 268, are directed to the shading look-up tables for red, green, and blue components 284, 286, and 288, respectively. The outputs from the red, green, and blue shading look-up tables 284, 286, and 288 are respectively directed to multiplexers 290, 292, and 294. Also directed to multiplexers 290, 292, and 294 are the values from the corresponding color look-up tables of the density processor 268. The output of multi-plexers 290, 292, and 294 yield the red, green, and blue signals from the shading processor 56 which are directed optionally to the shadow processor 58 or, alternatively, to the frame buffer 60. The shadow processer 56 is described in detail in connection with FIG. 10 below.

The mathematical procedure utilized by the shading processor 56 is set forth and described in a paper entitled "Image Shading of Three-Dimensional Objects", Department of Radiology Technical Report MIPG85, by Dan Gordon and R.A. Reynolds, published in November, 1983 which is incorporated herein by reference as if set forth in full.

Figure 9B:
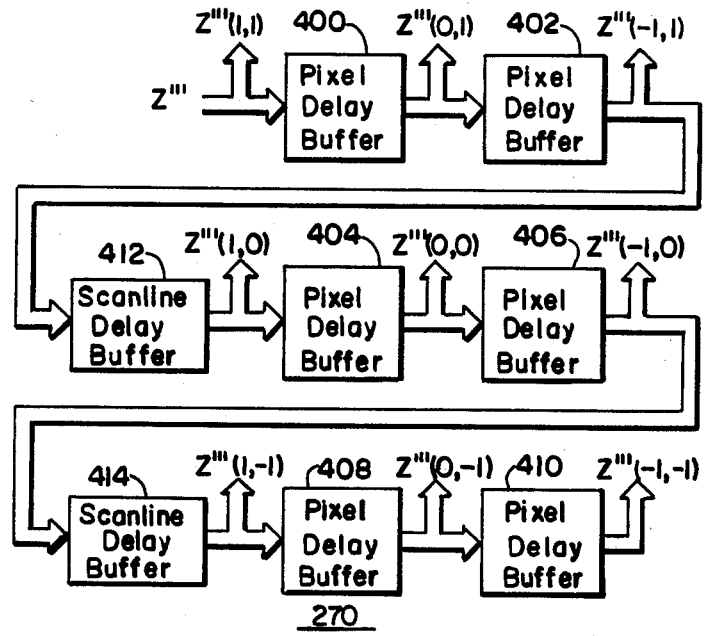
FIG. 9(b) is a block diagram of the serpentine buffer portion of the gradient processor of FIG. 9(a)

Referring now to FIG. 9(b), details of the gradient processor 270 will be described in further detail. The gradient processor 270 comprises a serpentine buffer which includes a series of pixel delays 400, 402, 404, 406, 408, and 410 in series with a pair of scan line delays 412 and 414 of a type well known to those skilled in the art. The serpentine buffer 270 yields a series of outputs Z'''(+1, +1) through Z'''(−1, −1), each of which are delayed from the others. These outputs are directed to the circuit of FIG. 9(c) which computes the surface gradient normal of the object under consideration on a pixel-by-pixel basis.

Figure 9C:
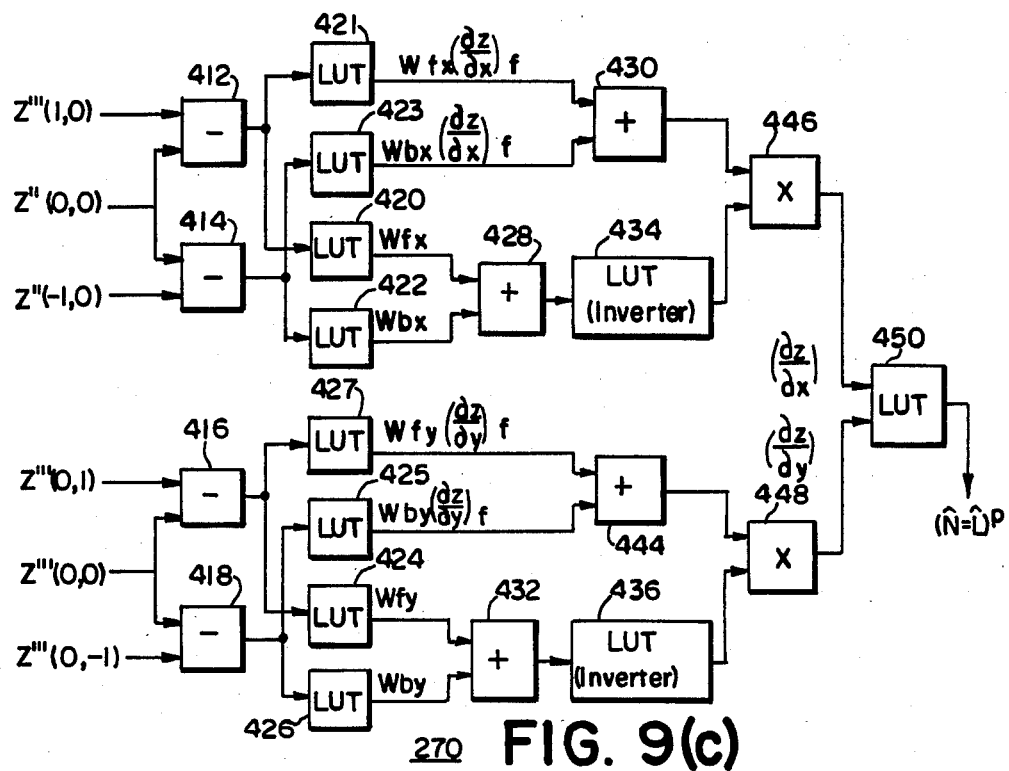
FIG. 9(c) is a block diagram of the gradient computation unit of the gradient processor of FIG. 9(a)

As shown in FIG. 9(c), only five (5) of the nine (9) possible outputs of the serpentine buffer 270 have been employed. Output values from the serpentine buffer 270 are directed to subtractors or difference circuits 412, 414, 416, and 418 as shown. The difference circuits 412, 414, 416, and 418 compute the difference between the depth value Z''' of one pixel with respect to a neighboring pixel. Trace differences are required in order to determine the change in depth of the surface of the object under consideration from one pixel to its neighboring pixel. The differences computed by the difference circuits 412, 414, 416, and 418 are directed to a plurality of look-up tables 420, 421, 422, 423, 424, 425, 426 and 427 which provide a weighted differential, i.e., the greater the slope or difference between one pixel and its neighbor, the smaller the weight. Such a weighting function is set forth and described at length in the aforementioned paper of Gordon and Reynolds.

The weighted differential from look-up Tables 420 and 422 are directed to a first adder 428 and to a second adder 430. The outputs of look-up table 424 and look-up table 426 are directed to a third adder 432 and a fourth adder 434. The combined outputs from the adder 428 are directed to a look-up table 434 whereas the combined outputs from adder 432 are directed to a look-up table 436. Look-up tables 434 and 436 implement an inverse function in accordance with the teachings of the aforementioned paper of Gordon and Reynolds, the outputs being directed to multipliers 446 and 448. Also directed to multipliers 446 and 448 are the summations from adders 430 and 444, respectively. The outputs from multipliers 446 and 448 are directed to a look-up table stored in memory 450 which yields the output signal from the gradient processor 270. The output signal from the gradient processor 270 is a scaled signal varying between 0 and 1 which modulates the intensity of the depth shading processor 272 in accordance with the gradient of the surface of the object under consideration when compared to the direction of the simulated light source. The table stored in look-up table 450 is loaded by the host computer 18 for each orientation of the object under consideration. It should be clear that all look up tables are loaded by the host 18 and may be varied interactively to produce the desired shading effect.

Shadow Processor

Figure 10:
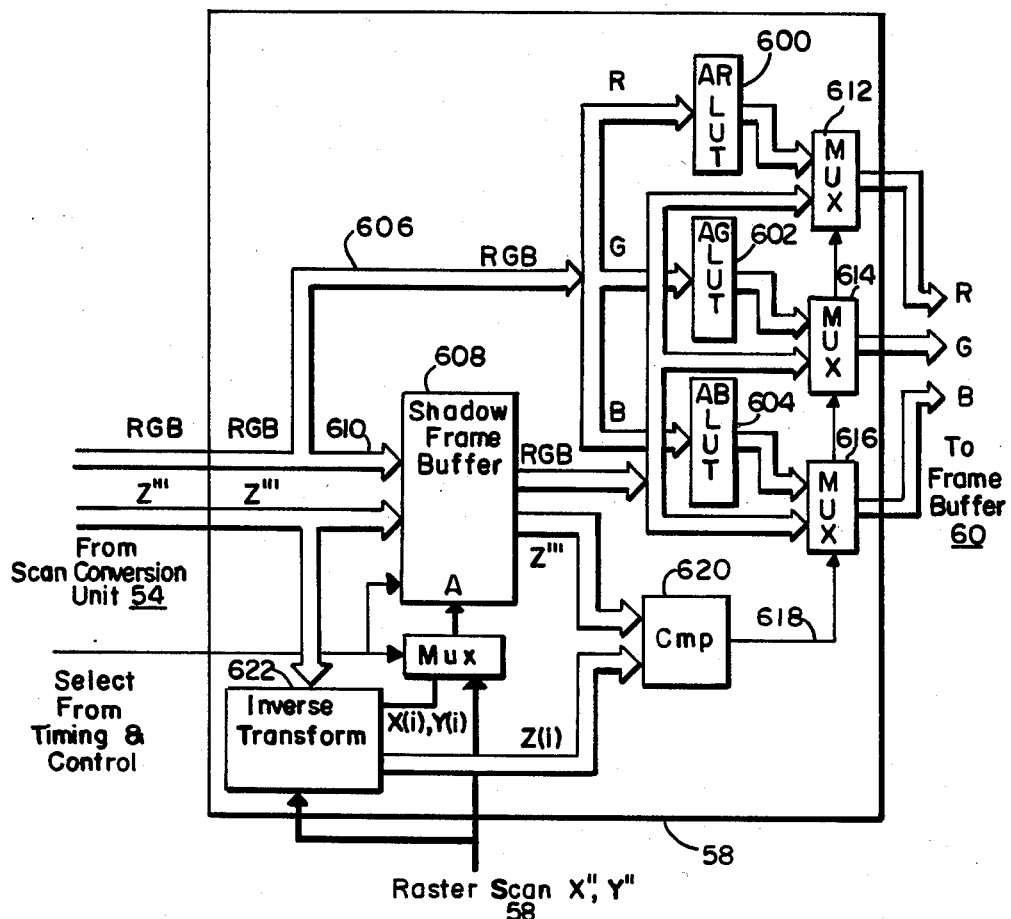
FIG. 10 is a detailed block diagram of the shadow processor of FIG. 3.

Referring now to FIG. 10, the shadow processor 58 will be described in detail. For any given pixel, the shadow processor 58 outputs a red, green and blue intensity value or an attenuated red, green and blue intensity value depending upon whether or not the point under consideration is within the shadow of a simulated light source or not. Incoming red, green and blue intensity values from the shadow processor 56 are directed to attenuation look-up tables 600, 602 and 604 via line 606. Red, green and blue intensity values are further directed to a shadow frame buffer 608 via line 610. Unattenuated red, green and blue values are directly output from the shading frame buffer 608 to multiplexers 612, 614 and 616 which operate under the control of a control signal 618 from a comparator 620. Depending upon the state of the control signal 618 to the multiplexers 612, 614 and 616, either an unattenuate intensity signal from the shadow frame buffer 608 is output to the CRT display means 22 or, alternatively, the attenuated red, green and blue intensity signal from the attenuation look-up tables 600, 602 and 604 are directed to the frame buffer 60. The unattenuated or the attenuated intensity signals are directed to the frame buffer 60 depending upon whether or not the point under consideration is fully illuminated from a simulated light source or whether that same point lies within a shadow region with respect to that light source. In making this determination, two video frame times are required. In a first video frame time period, red, green and blue intensity values from the shading processor 56 are stored in the shadow frame buffer 608 along with the depth of the object for that pixel, $Z'''$, which is received from the scan conversion unit 54. In the next video frame time period, the distance Z(i) from the simulated light source to the point under consideration is computed by the inverse transform unit 622. Additionally, X(i) and Y(i) are computed by the inverse transform unit 622 which is used as an index into the shadow frame buffer 608 in order to select the point $Z'''$ for comparison with Z(i) at comparator 620. X(i), Y(i) and Z(i) are the coordinates of the point under consideration with respect to the simulated light source. The distance, Z(i), is compared with the absolute depth, $Z'''$, from the previous frame at the comparator 620. If the distance, Z(i), from the simulated light source to the point under consideration equals the distance between the viewer and the point ($Z'''$), the point under consideration is illuminated and control signal 618 causes the multiplexer 612, 614 and 616 to pass unattenuated red, green and blue intensity values to the frame buffer 60. Alternatively, if the distance between the simulated light source and the point under consideration, Z(i), differs from the distance between the point and the viewer ($Z'''$), then the point is considered to lie within a shadow region and the attenuated red, green and blue intensity values from the look-up tables 600, 602 and 604 are passed to the CRT 22.

Object Access Unit

Figure 11:
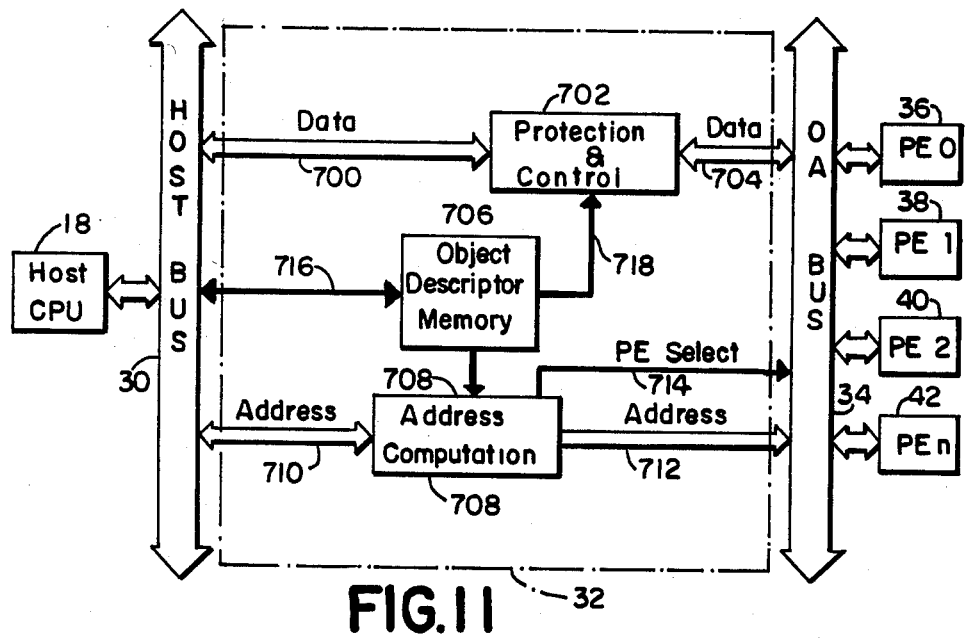
FIG. 11 is a detailed block diagram of the object access unit of FIG. 3.

Referring now to FIG. 11, the object access unit 32 will be described. The object access unit 32 is coupled between the host bus 30 and the object access bus 34 and acts as an interface between the host computer 18 and the various individual processing elements 36-42, etc. The object access unit 32 includes a protection and control means 702 for protecting data stored in the various processing elements from modification. Data from the host bus 30 is directed to the process and control unit 702 via databus 700. Data from the protection and control unit 702 is directed to the object access bus 34 by a databus 704. The object access unit 32 further includes an object descriptor memory 706. Information concerning each independent object under consideration is directed to the object descriptor memory 706 via lin 716 from the host bus 30. The object descriptor memory 706 contains the identification of the particular processing elements 36-42, etc. which will be used to compute the mini-image for a given object or portion of a given object as directed by the host.

The object access unit 32 further includes an address computation means 708 which is coupled to the host bus 30 by a first address bus 710 and which is further coupled to the object access bus 34 by a second address bus 712.

When the host 18 transmits data concerning a given object to be displayed across host bus 30, the data is directed to the protection and control means 702 and the address of that data is directed to the address computation means 708 via address bus 710. The address computation means 708 is responsive to the object descriptor memory 706 and computes the corresponding processing element address and the corresponding processing element selection code which is transmitted via line 714 to object access bus 34.

In short, the object access unit 32 permits the host to select and assign various processing elements to compute the mini-image of a given object and records and determines the appropriate addresses at which the object data is stored in the object memories of the respective processing elements.

While a particular embodiment of the present invention has been shown and described, it will be appreciated that other modifications may be made within the spirit and scope of the present invention. These modifications are to be included within the scope of the appended claims.

What is claimed is:

1. A real-time three-dimensional display device comprising:
   (a) a plurality of individual processing elements each having:
      (i) an associated object memory for storing a first digital representation of a portion of a three-dimensional objet to be displayed;
      (ii) an image memory for storing a second digital representation of a mini-image of the visible surface of that portion of the object as viewed from a selected direction with respect to a predetermined plane including the relative depth of that surface at each pixel of the mini-image;
      (iii) means for selecting said direction including means for mapping said first digital representation into said second digital representation; and
   (b) means for generating priority codes based upon the relative significance of a given pixel of the mini-image produced by a given processing element as compared to the pixels of mini-images produced by other processing elements for a given pixel in the combinedimage produced by all of said processing elements; and
   (c) merge control means responsive to said priority codes for generating the combined image of said object including, at each pixel, the depth of the visible surface of the object from said predetermined plane said combined image being generated on a pixel-by-pixel basis from said mini-images, each pixel of said combined image including only a selected pixel of said mini-images which is visible for a given orientation of said object, the pixel being selected in accordance with said priority codes.

2. The display device of claim 1 further comprising:
   (d) a video post-processing unit for generating an enhanced image from said combined image.

3. The display device of claim 2 further comprising:
   (e) a frame buffer for storing said enhanced image.

4. The display device of claim 3 further comprising:
   (f) a display means, responsive to said frame buffer, for displaying said enhanced image.

5. The display device of claim 2 wherein said video post-processing unit further comprises:
   a scan conversion means for generating a coherent image from said combined image.

6. The display device of claim 2 wherein said video post-processing unit further comprises:
   a shading processor means for varying the intensity of portions of said combined image with respect to other portions of said combined image depending upon the relative distance and orientation of such portions from a simulated light source.

7. The display device of claim 6 wherein said shading processor means controls the intensity of portions of said combined image relative to the intensity of other portions of said combined image.

8. The display device of claim 2 wherein said video post-processing unit further comprises:
   a shadow processor for adding shadow effects caused by a simulated light source to said combined image.

9. The display device of claim 2 wherein said video post processing unit further comprises:
   (i) a scan conversion means for generating a coherent image from said combined image;
   (ii) a shading processor means responsive to said scan conversion means for varying the intensity of portions of said coherent image with respect to the intensity of other portions of said coherent image; and
   (iii) a shadow processor responsive to said shading processor for adding shadow effects caused by a simulated light source to said coherent image to produce said enhanced image.

10. The display device of claim 9 further comprising:
    (e) a frame buffer responsive to said video post-processor unit for storing the enhanced image produced thereby.

11. The display device of claim 10 further comprising:
    (f) a display means responsive to said frame buffer for displaying the enhanced image of said object.

12. The display device of claim 1 wherein said means for generating a priority code further comprising:
    logic means for generating a low priority code for pixels in the mini-image of a given processing element whenever the object memory for that processing element contains no digital representations of said three-dimensional object.

13. The display device of claim 1 further comprising:
    means for controlling said mapping means whereby the mapping of said first to said second digital representation may be selectively controlled.

14. The display device of claim 13 wherein said means for controlling selectively permits the mapping of points from said first to said second digital representation having a predetermined set of densities.

15. The display device of claim 13 wherein said means for controlling selectively permits the mapping of points from said first to said second digital representation having a predetermined depth function with respect to said predetermined plane.

16. The display device of claim 13 wherein said first digital representation includes a time dimension and wherein said means for controlling selectively permits the mapping of points from said first to said second digital representation having selected time sequences.

17. A real-time three-dimensional display device comprising:
    (a) a plurality of individual processing elements each having an image memory for storing a mini-image generated by that processing element including the relative depth of each pixel of such mini-image;
    (b) means associated with said processing elements for generating said mini-images; and
    (c) a merge control means for generating a combined image from each of said mini-images by selection based upon the relative significance of a given pixel of the mini-image produced by a given processing element as compared to the pixels of mini-images produced by other processing elements for a given for a given pixel in the combined image produced by all of said processing elements on a pixel-by-pixel basis said combined image including at each pixel the depth from a predetermined plane.

18. The display device of claim 17 further comprising:
    (d) a video post-processing unit for generating an enhanced image from said combined image.

19. The display device of claim 18 further comprising:
    (e) a frame buffer for storing said enhanced image.

20. The display device of claim 19 further comprising:
    (f) a display means, responsive to said frame buffer, for displaying said enhanced image.

21. The display device of claim 18 wherein said video post-processing unit further comrpises:
   a scan conversion means for generating a coherent image from said combined image.

22. The display device of claim 18 wherein said video post-processing unit further comprises:
   a shading processor means for varying the intensity of portions of said combined image with respect to other portions of said combined image depending upon the relative distance and orientation of such portions from a simulated light source.

23. The display device of claim 22 wherein said shading processor means controls the intensity of portions of said combined image relative to the intensity of other portions of said combined image.

24. The display device of claim 18 wherein said video post-processing unit further comprises:
   a shadow processor for adding shadow effects caused by a simulated light source to said combined image.

25. The display device of claim 18 wherein said video post processing unit further comprises:
   (i) a scan conversion means for generating a coherent image from said combined image;
   (ii) a shading processor means responsive to said scan conversion means for varying the intensity of portions of said coherent image with respect to the intensity of other portions of said coherent image; and
   (iii) a shadow processor responsive to said shading processor for adding shadow effects caused by a simulated light source to said coherent image to produce said enhanced image.

26. The display device of claim 25 further comprising:
   (e) a frame buffer responsive to said video post-processos unit for storing the enhanced image produced thereby.

27. The display device of claim 26 further comprising:
   (f) a display means responsive to said frame buffer for displaying said enhanced image.

28. The display device of claim 17 further comprising:
   (d) means for controlling said mini-image generation means whereby the generation of each of said mini-images is selectively controlled.

29. The display device of claim 28 wherein said means for controlling selectively permits the generation of mini-images having a predetermined set of densities.

30. The display means of claim 28 wherein said means for controlling selectively permits the generation of mini-images having a predetermined depth function with respect to a predetermined plane.

31. The display device of claim 28 wherein said means for controlling selectively permits the generation of mini-images in a selected time sequence.

32. A real time, interactive, medical image display system for displaying data representing a three-dimensional anatomical object, said data having been collected by at least one medical image acquisition device comprising:
   (a) a host computer for receiving and storing said data;
   (b) an image display processor coupled to said host computer, said image display processor having:
      (i) a plurality of individual processing elements each having an image memory for storing a mini-image of the visible surface of a portion of said object as viewed from a selected direction with respect to a predetermined plane including the relative depth of that surface;
      (ii) means associated with said processing elements for selecting said direction and for generating said mini-images; and
      (iii) a merge control means for generating a combined image from each of said mini-images by selection based upon the relative significance of a given pixel of the mini-image produced by a given processing element as compared to the pixels of mini-images produced by other processing elements for a given pixel in the combined image produced by all of said processing elements on a pixel-by-pixel basis, each pixel of said combined image including the depth of the visible surface of the object from said predetermined plane; and
   (c) display means, coupled to said image display processor, for displaying said combined image.

33. The system of claim 32 wherein said image display processor further comprises:
   (iv) an object access unit coupled between said host computer and each of said individual processing elements for assigning subsets of said data to selected ones of said processing elements.

34. The system of claim 32 wherein said image display processor further comprises:
   (iv) a coordinate transform means, coupled to said host computer, for generating mapping signals to each of said individual processing elements, said mapping signals varying the min-image produced by each of said processing elements depending upon the direction selected with respect to said predetermined plane.

35. The system of claim 32 wherein each such individual processing element of said image display processor further comprises:
   (iv) a coordinate transform means, coupled to said host computer, for generating mapping signals to such processing element, said mapping signals varying the mini-image produced by that processing element depending upon the portion of the object or objects whose mini-image is computed by that processing element.

36. The system of claim 32 wherein said image display processor further comprises:
   (iv) control means coupled to said host computer and to said individual processing elements for selectively controlling the generation of said mini-images.

37. The system of claim 32 wherein said image display processor further comprises:
   (iv) a video post processing unit for generating an enhanced image from said combined image.

38. The system of claim 37 wherein said video post processing unit further comprises:
   a scan conversion means for generating a coherent image from said combined image.

39. The system of claim 37 wherein said video post processing unit further comprises:
   a shading processor for varying the intensity of portions of said combined image with respect to the intensity of other portions of said combined image depending upon the relative distance and orientation of such portions with respect to a simulated light source.

40. The system of claim 37 wherein said video post processing unit further comprises:
 a shadow processor for adding shadow effects to said combined image.

41. The system of claim 32 wherein each of said individual processing elements of said image display processor further comprises:
 an object memory for storing a first digital representation of portions of said objects;
 an image memory for storing a second digital representation of the mini-image of that portion of said object; and
 a means for mapping said first to said second digital representations.

42. The system of claim 41 wherein each of said individual processing elements of said image display processor further comprises:
 means coupled between said object memory and said image memory for controlling the mapping of said first to said second digital representation.

43. The system of claim 42 wherein said first digital representation includes a time dimension and wherein said means for controlling selectively permits the mapping of points from said first to said second digital representation having selected time sequences.

44. The system of claim 42 wherein said means for controlling the mapping means permits the mapping of points from said first to said second digital representation having a predetermined set of densities.

45. The system of claim 42 wherein said means for controlling the mapping means permits the mapping of points from said first to said second digital representation having a predetermined depth function with respect to a predetermined plane.

46. The system of claim 41 wherein said first and said second digital representations each include a density dimension and wherein each such individual processing element further includes:
 a volume feature counter for accumulating the number of points stored in the mini-image of that processing element having a non-zero density dimension, said host computer being responsive to the volume feature counters of each of said processing elements whereby the volume of said anatomical object may be automatically computed.

47. Am image display device comprising:
 (a) a plurality of individual processing elements, each for computing a mini-image of a portion of an object and each having an image memory for storing that mini-image including the relative depth thereof; and
 (b) a merge control means for generating a combined image from each of said mini-images by selection based upon the relative significance of a given pixel of the mini-image produced by a given processing element as compared to the pixels of mini-images produced by other processing elements for a give pixel in the combined image produced by all of said processing elements on a pixel-by-pixel basis said combined image including the depth at each pixel from a predetermined plane.

48. A real-time three-dimensional image display device comprising:
 (a) a plurality of individual processing elements, each for producing a mini-image of a portion of a three-dimensional object;
 (b) merge control means for generating a combined image of said object on a pixel-by-pixel basis from each of said mini-images, each pixel of said combined image having a density value and a depth value relative to a predetermined plane, said combined image as generated by said merge control means having insufficient data to yield a coherent image at certain orientations of said object as said combined image is projected on a display means; and
 (c) scan conversion means responsive to said combined image for generating a coherent image despite said insufficient data said scan conversion means having:
  (i) a serpentine buffer for delaying each given pixel of said combined image; and
  (ii) a template memory, said serpentine buffer being responsive thereto, for storing neighboring pixels of said delayed pixel, the density value of said given pixel being substituted by the density value of a neighboring pixel whenever said neighboring pixel has a non-zero density value and a relative depth less than the relative depth of said given pixel.

49. The image display device of claim 48 wherein said template memory stores the density value and depth value of eight neighboring pixels.

50. A real-time, three-dimensional image display device comprising:
 (a) a means for producing an image on a pixel-by-pixel basis, each pixel of said image having a density value and a depth value relative to a predetermined plane;
 (b) a shading processor responsive to said image for adding shading effects to said iamge, said shading processor having:
  (i) a gradient shading processor responsive to said depth values, for computing the surface normal of each pixel of said image on a pixel-by-pixel basis; and at least one of
  (ii) a density shading processor responsive to said density values; and
  (iii) a depth shading processor responsive to said depth values; and wherein said shading processor further includes a means responsive to outputs of said gradient shading processor and at least one of said density, and depth shading processors for generating a final image on a pixel-by-pixel basis, the intensity of said final image being varied in accordane with the depth value, or the density value and the surfae normal for each pixel.

51. A real-time, interactive display system comprising:
 (a) a host computer;
 (b) an image display processor coupled to said host computer, said image display processor having:
  (i) a plurality of individual processing elements each having an image memory for storing a mini-image generated by that processing element including the relative depth;
  (ii) means associated with each of said processing elements, for generating said mini-images; and
  (iii) merge control means for generating a combined iamge from each of said mini-images by selection based upon the reltive significance of a given pixel of the mini-image produced by a given processing element as compared to the pixels of mini-images produced by other processing elements for a given pixel in the combined image produced by all of said processing elements on a pixel-by-pixel basis each pixel of said combined image including the depth at that pixel from a predetermined plane; and (c) display means, coupled to said image display processor, for displaying said combined image.

52. The system of claim 51 wherein said image display processor further comprises:

an access unit coupled between said host computer and each of said individual processing elements for controlling the mini-images generated by each processing element.

53. The system of either of claims 32 or 51 wherein said merge control means generates said combined image in raster scan order.

54. The display device of claim 17 wherein said merge control means generates said combined image in raster scan order.

* * * * *

UNITED STATES PATENT AND TRADEMARK OFFICE
CERTIFICATE OF CORRECTION

PATENT NO. : 4,737,921

DATED : April 12, 1988

INVENTOR(S) : Samuel M. Goldwasser, et al.

It is certified that error appears in the above-identified patent and that said Letters Patent is hereby corrected as shown below:

Column 2, line 55, "t" should read -- to --;
Column 6, line 63, "t" should read -- to --;
Column 9, line 65, "computer" should read -- Computer --;
Column 10, line 45, "embodiement" should read -- embodiment --;
Column 11, line 12, "stll" should read -- still --;
Column 11, line 12, "aslects" should read -- aspects --;
Column 13, line 10, after "more" delete "20";
Column 15, line 8, "miniimage" should read -- mini-image --;
Column 20, line 15, "p iority" should read -- priority --;
Column 21, line 61-62, after "interaction" delete "10";
Column 22, line 13, "t" should read -- to --;
Column 28, line 36, "lin" should read -- line --;
Column 29, line 7, "objet" should read -- object --;
Column 29, line 22, "combinedimage" should read -- combined image --;

Column 33, line 57, "give" should read -- given --;
Column 34, line 33, "iamge" should read -- image --;
Column 34, line 49, "surfae" should read -- surface --;
Column 34, line 63, "iamge" should read -- image --.

Signed and Sealed this

First Day of November, 1988

*Attest:*

DONALD J. QUIGG

*Attesting Officer*        *Commissioner of Patents and Trademarks*